United States Patent [19]

Daggett et al.

[11] Patent Number: 4,908,556

[45] Date of Patent: Mar. 13, 1990

[54] MODULAR ROBOT CONTROL SYSTEM

[75] Inventors: Kenneth E. Daggett, Murrysville, Pa.; Eimei M. Onaga, Brookfield Center, Conn.; Richard J. Casler, Jr., Newtown, Conn.; Barrett L. Booth, Brookfield, Conn.

[73] Assignee: Unimation Inc., Danbury, Conn.

[21] Appl. No.: 932,983

[22] Filed: Nov. 20, 1986

[51] Int. Cl.⁴ .......................... G06F 9/02; B25J 13/00
[52] U.S. Cl. ................................. 318/568.2; 364/513; 318/568.22
[58] Field of Search ................... 901/2, 19, 23, 24, 50; 318/568; 364/513

[56] References Cited

U.S. PATENT DOCUMENTS

| | | | |
|---|---|---|---|
| 4,240,016 | 12/1980 | Inaba et al. | 901/23 X |
| 4,538,233 | 8/1985 | Resnick et al. | 901/2 X |
| 4,578,764 | 3/1986 | Hutchins et al. | 901/2 X |
| 4,594,670 | 6/1986 | Itoh | 318/568 X |
| 4,613,269 | 9/1986 | Wilder et al. | 901/14 X |
| 4,623,971 | 11/1986 | Ailman et al. | 901/19 X |
| 4,625,285 | 11/1986 | Mori et al. | 901/2 X |
| 4,631,689 | 12/1986 | Arimura et al. | 901/2 X |
| 4,633,414 | 12/1986 | Yabe et al. | 901/2 X |
| 4,654,569 | 3/1987 | Mizumoto et al. | 318/568 |
| 4,665,352 | 5/1987 | Bartelt et al. | 318/568 |
| 4,718,078 | 1/1988 | Bleidorn et al. | 318/568 |

*Primary Examiner*—Bentsu Ro
*Attorney, Agent, or Firm*—J. L. Brzuszek

[57] ABSTRACT

A modular digital robot control includes an electronic arm interface board provided with circuitry for performing robot arm dependent functions. Included are circuitry for generating power amplifier control signals in response to input voltage command signals and circuitry for processing and manipulating position, velocity and motor current feedback signals.

An electronic torque processor board is provided with paired torque microprocessors for operating each of respective torque control loops for respective robot joint motors. The torque microprocessors generate the voltage commands in response to input torque commands and feedback motor current signals.

An electronic servo control board is provided with paired position/velocity microprocessors for operating position and velocity control loops for the respective joint motors. The position/velocity microprocessors generate the torque commands in response to input position commands and feedback position and velocity signals. The servo control board further includes system resource facilities providing general support for the operation of the microprocessors and includes a DMC controller and two asynchronous controllers for communications interfacing with local input/output devices and other systems and devices.

When executed in one of the position/velocity microprocessors, a stored motion program uses trajectory planning and interpolation to generate position commands in accordance with predefined moves set forth in a robot program. The servo control, torque processor and arm interface boards are interconnected to provide a complete basic control for the robot joint motors. An optional fourth electronic board can be connected to the basic control. It is called a system board and it includes paired system microprocessors that execute the motion program enabling the expanded control to provide extended robot control performance.

11 Claims, 31 Drawing Sheets

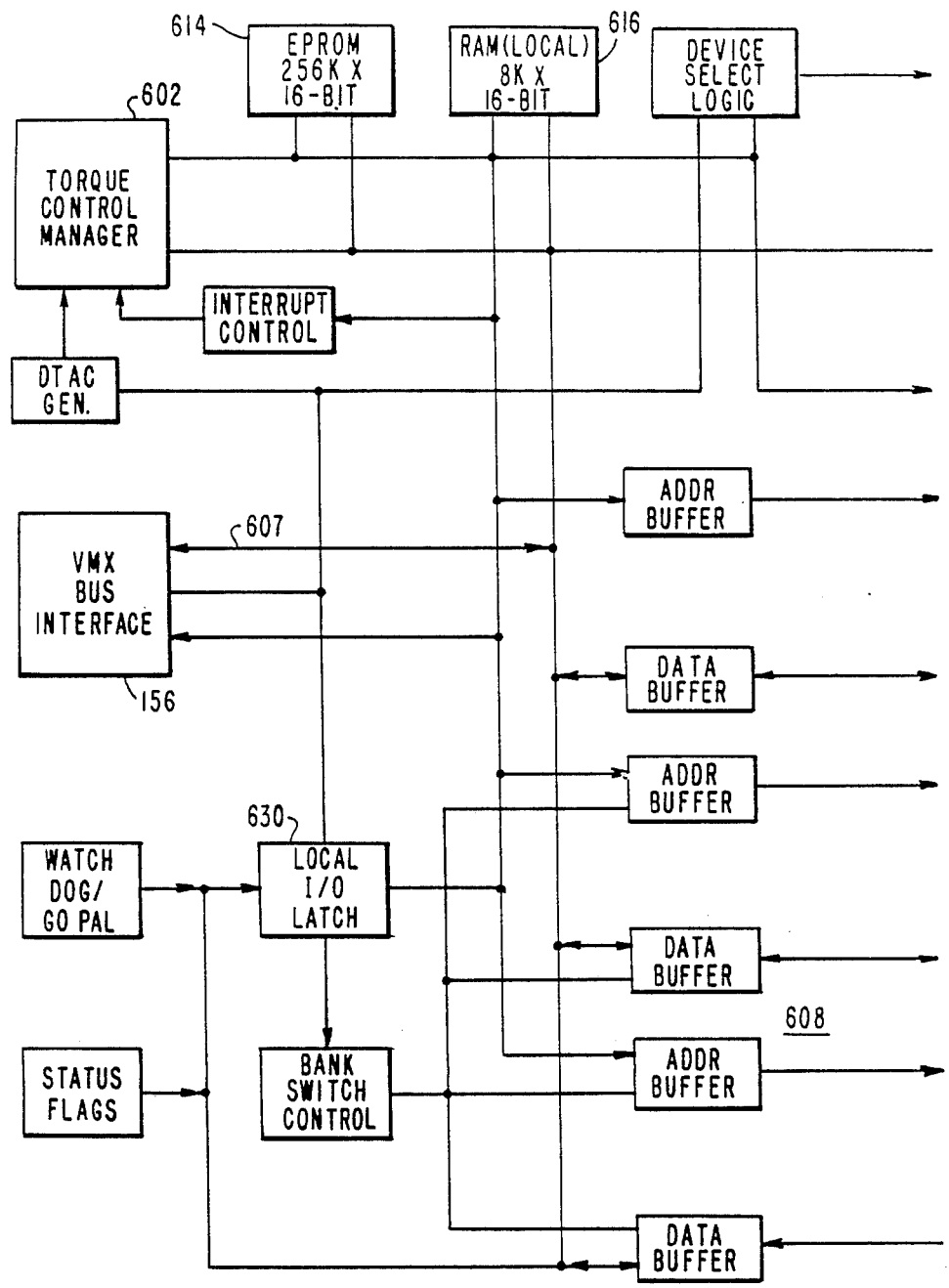
FIG.8A-I

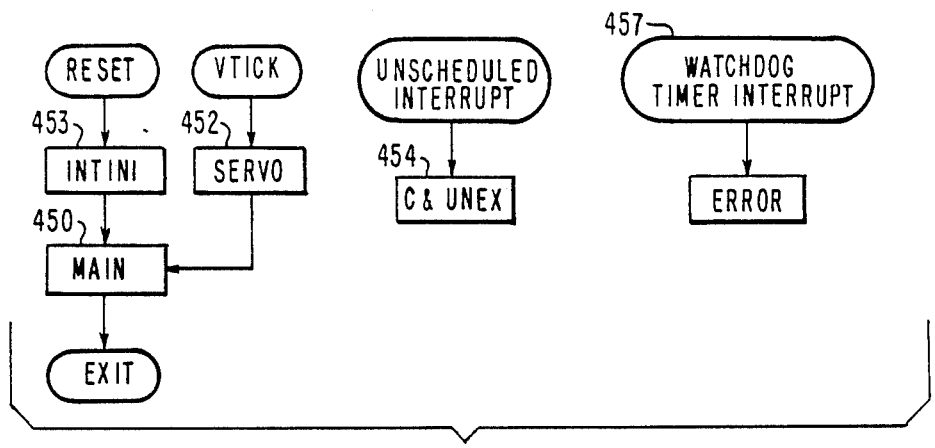
FIG. 10B
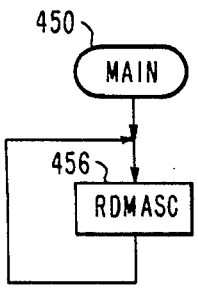
FIG. 10C
FIG. 10D

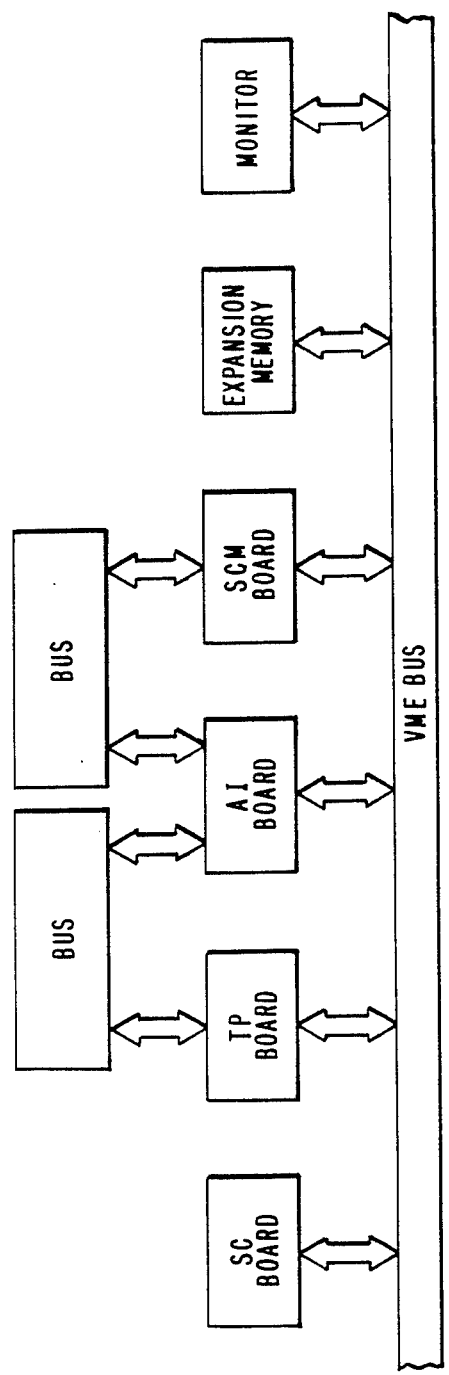
FIG.IIA

| | JT1,2,3 | JT4 | JT5,6 |
|---|---|---|---|
| Rs | 0.02 | 0.04 | 0.05 |
| $K_{if}$ 6.8 | 0.124V/A =>40 32A/5V | 0.248V/A =>20 16A/5V | 0.310V/A =>16 13A/5V |

MODULAR ROBOT CONTROL SYSTEM

CROSS REFERENCE TO RELATED APPLICATIONS

The following concurrently filed patent applications are related to the disclosure of the present application, each filed on Nov. 20, 1986, assigned to the present assignee and are hereby incorporated by reference:

U.S. Ser. No. 932,975 now Continuation Ser. No. 180,719 filed Apr. 4, 1988 entitled DIGITAL ROBOT CONTROL HAVING AN IMPROVED CURRENT SENSING SYSTEM FOR POWER AMPLIFIERS IN A DIGITAL ROBOT CONTROL and filed by Kenneth E. Daggett, Leonard C. Vercellotti, Richard A. Johnson, Richard J. Casler and Eimei Onaga.

U.S. Ser. No. 932,841, now Continuation Ser. No. 231,627, filed Aug. 5, 1988 entitled DIGITAL ROBOT CONTROL HAVING AN IMPROVED PULSE WIDTH MODULATOR and filed by Kenneth E. Daggett.

U.S. Ser. No. 932,992 now Continuation Ser. No. 180,703 filed Apr. 5, 1988 entitled COMMUNICATION INTERFACE FOR MULTI-MICROPROCESSOR SERVO CONTROL IN A MULTI-AXIS ROBOT CONTROL SYSTEM and filed by Kenneth E. Daggett.

U.S. Pat. No. b 4,763,055 entitled DIGITAL ROBOT CONTROL HAVING HIGH PERFORMANCE SERVO CONTROL SYSTEM and filed by Kenneth E. Daggett, Richard J. Casler and Eimei Onaga.

U.S. Ser. No. 932,974, now Continuation Ser. No. 178,813 filed Apr. 1, 1988 entitled DIGITAL ROBOT CONTROL PROVIDING PULSE WIDTH MODULATION FOR A BRUSHLESS DC DRIVE and filed by Kenneth E. Daggett, Richard A. Johnson, Eimei Onaga and Richard J. Casler.

U.S. Ser. No. 932,853 now Continuation Ser. No. 178,811 filed Apr. 1, 1988 entitled IMPROVED POSITION AND VELOCITY FEEDBACK SYSTEM FOR A DIGITAL ROBOT CONTROL and filed by Kenneth E. Daggett, Richard J. Casler and Eimei Onaga.

U.S. Ser. No. 932,982 entitled UNIVERSAL ROBOT CONTROL BOARD CONFIGURATION and filed by Richard J. Casler, Eimei Onaga, Vincent P. Jalbert, Barrett Booth, and Kenneth E. Daggett.

U.S. Ser. No. 932,991 entitled BASIC DIGITAL MULTIAXIS ROBOT CONTROL HAVING MODULAR PERFORMANCE EXPANSION CAPABILITY and filed by Kenneth E. Daggett, Barrett Booth, Eimei Onaga and Richard J. Casler.

U.S. Pat. No. 4,786,847 entitled IMPROVED DIGITAL CONTROL FOR MULTIAXIS ROBOTS and filed by Kenneth E. Daggett, Richard J. Casler, Eimei Onaga, Barrett Booth, Rajan Penkar, Leonard C. Vercellotti and Richard A. Johnson.

U.S. Ser. No. 932,977, now Continuation Ser. No. 180,601 filed Apr. 6, 1988 entitled MULTIPROCESSOR TORQUE SERVO CONTROL FOR MULTIAXIS DIGITAL ROBOT CONTROL SYSTEM and filed by Kenneth E. Daggett, Richard J. Casler and Eimei Onaga.

U.S. Ser. No. 932,990, now Continuation Ser. No. 180,723 filed Mar. 4, 1988 entitled MULTIPROCESSOR POSITION/VELOCITY SERVO CONTROL FOR MULTIAXIS DIGITAL ROBOT CONTROL SYSTEM and filed by R. Lancraft, Eimei Onaga, Richard J. Casler, Kenneth E. Daggett and Barrett Booth.

U.S. Ser. No. 932,986 entitled MULTIAXIS ROBOT HAVING IMPROVED MOTION CONTROL THROUGH VARIABLE ACCELERATION/DECELERATION PROFILING and filed by Rajan Penkar.

U.S. Ser. No. 932,988 entitled MULTIAXIS ROBOT CONTROL HAVING CAPABILITY FOR EXECUTING TIMED MOVES and filed by Rajan Penkar.

U.S. Ser. No. 932,985 entitled MULTIAXIS ROBOT CONTROL HAVING IMPROVED CONTINUOUS PATH OPERATION and filed by Rajan Penkar.

U.S. Ser. No. 932,840 entitled MULTIAXIS ROBOT CONTROL HAVING FITTED CURVED PATH CONTROL and filed by Rajan Penkar and Timothy Skewis.

U.S. Ser. No. 932,973, now Continuation Ser. No. 180,598 filed Apr. 6, 1988 entitled MULTIAXIS ROBOT CONTROL HAVING IMPROVED ENERGY MONITORING SYSTEM FOR PROTECTING ROBOTS AGAINST JOINT MOTOR OVERLOAD and filed by Eimei Onaga.

U.S. Ser. No. 932,842 entitled MULTIAXIS DIGITAL ROBOT CONTROL HAVING A BACKUP VELOCITY MONITOR AND PROTECTION SYSTEM and filed by Eimei Onaga.

BACKGROUND OF THE INVENTION

The present invention relates to robots and more particularly to robot control systems and the architecture with which such systems are configured.

The development of robotic systems has been accelerating and as a result robotic hardware and software capabilities have been expanding to enable more demanding and more complex robot tasks to be performed. As robots become more capable, new robot application areas are opened which in turn encourage the development of higher levels of robot capability.

In the incorporated by reference patent applications, there is disclosed a completely digital robot control system which is efficiently adaptable to developing robot technology because of the ease with which new functionality or better performance of existing functionality can be integrated into the control system through new or improved algorithms, control tasks, control looping, and/or digital control hardware. The adaptability of the digital robot control results both from its digital character and its architectural configuration. Thus, its overall hierarchical and modular structural organization enables it to provide the control task partitioning and the data communication capabilities needed to allow for cost effective and cost efficient performance enhancements as robot technology continues to develop.

The referenced application Ser. No. 932,991 relates to a manner in which the robot control system is arranged to provide a widely usable basic robot control that can be modularly expanded to meet higher performance applications. The present invention is directed to the overall architectural configuration of the completely digital basic robot control which enables it to be modified readily to incorporate robot technology advancements such as new robot common languages, advanced motion control, very large scale integrated (VLSI) circuitry developments, etc.

SUMMARY OF THE INVENTION

A modular digital robot control includes an arm interface module provided with circuitry for performing robot arm dependent functions. Included are circuit means for generating power amplifier control signals in response to input voltage command signals and circuit means for processing and manipulating position, velocity and motor current feedback signals.

A torque processor module is provided with torque microprocessor servo means for operating each of respective torque control loops for respective robot joint motors. The torque microprocessor servo means generates the voltage commands in response to input torque commands and feedback motor current signals.

A servo control module is provided with position/velocity microprocessor servo means for operating position and velocity control loops for the respective joint motors. The position/velocity microprocessor servo means generates the torque commands in response to input position commands and feedback position and velocity signals. The servo control module further includes system resource means providing general support for the operation of the servo means and includes data communicating control means for communications interfacing with local input/output devices and other systems and devices.

When executed in the position/velocity microprocessor servo means, stored program means use trajectory planning and interpolation to generate position commands in accordance with predefined moves set forth in a robot program. The servo control, torque processor and arm interface modules are interconnected to provide a complete basic control for the robot joint motors.

BRIEF DESCRIPTION OF THE DRAWINGS

FIGS. 7A1-A2 show a block diagram of a servo control board employed in the robot control;

FIGS. 8A1-A2 show a block diagram of a torque processor board employed in the robot control;

FIGS. 10A-10H show various flow charts for programming employed on the SCM board;

FIG. 11A shows the electronic control boards from a data flow perspective;

FIGS. 12B1-12K show flow charts for programming implemented on the TP board.

DESCRIPTION OF THE PREFERRED EMBODIMENT

ROBOTS—GENERALLY

Robot capabilities generally range from simple repetitive point-to-point motions to complex motions that are computer controlled and sequenced as part of an integrated manufacturing system. In factory applications, robots can perform a wide variety of tasks in various manufacturing applications including: die casting, spot welding, arc welding, investment casting, forging, press working, spray painting, plastic molding, machine tool loading, heat treatment, metal deburring, palletizing, brick manufacturing, glass manufacturing, etc. For more complete consideration of robots and their uses, reference is made to a book entitled "Robotics In Practice" published in 1980 by Joseph F. Engelberger.

To perform work within its sphere of influence, a robot typically is provided with an arm, a wrist subassembly and an end effector. The coordinate system employed for the robot arm typically is Cartesian, cylindrical, polar or revolute. Generally, three motion axes are employed to deliver the wrist subassembly anywhere within the sphere of influence and three additional motion axes are employed for universal orientation of the end effector. A drive system is used for each motion axis, and it may be electrical, hydraulic or pneumatic.

PUMA ROBOT

Figure 1:
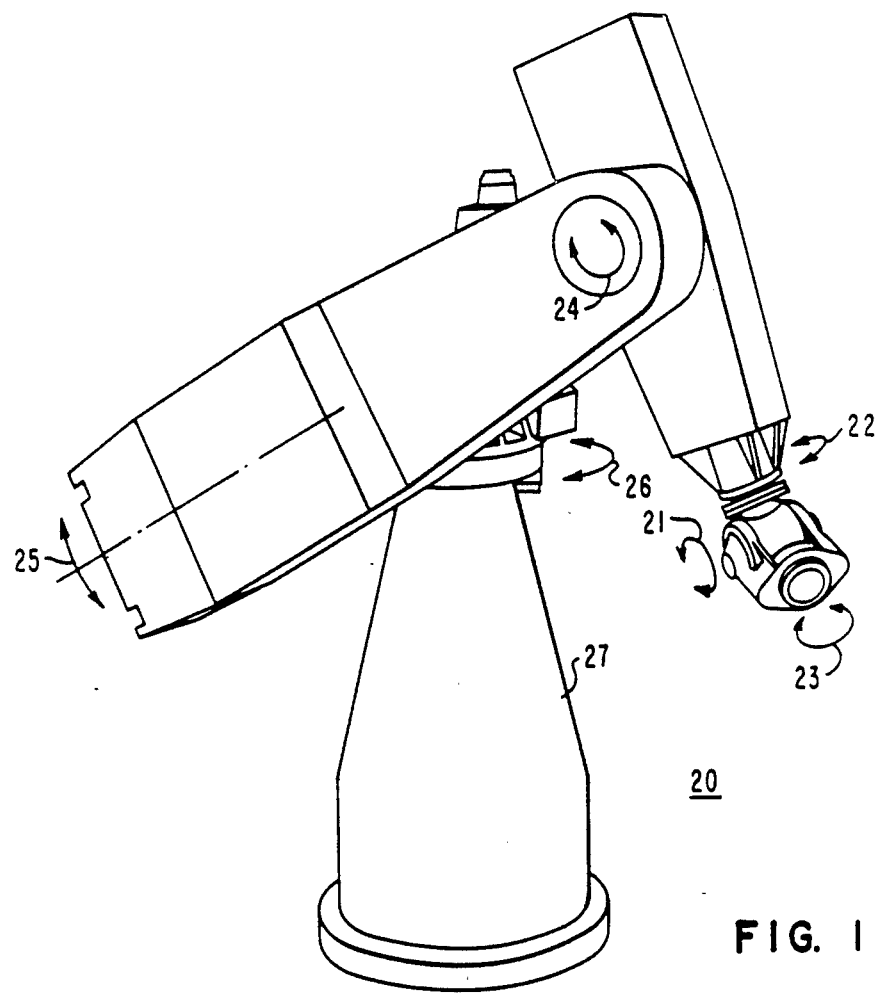
FIG. 1 shows a perspective view of a robot which is operated with more advanced and more accurate performance when controlled by a system making use of the invention.

More particularly, there is shown in FIG. 1 a six-axis industrial electric robot 20 which is illustrative of a wide variety of robots that can be operated in accordance with the principles of the invention. The robot 20 is a relatively powerful electric robot sold by Unimation Company, a wholly-owned company of the present assignee, under the trade name UNIMATE PUMA SERIES 700. The Model 761 PUMA has a 22 pound payload capacity and a reach of 59.1 inches. The Model 762 PUMA has a 44 pound payload capacity and a reach of 49.2 inches.

PUMA 700 Series robots are designed with flexibility and durability to ensure long life and optimum performance in even the harshest, most demanding manufacturing environments. Specific customer needs for either higher payload or extended reach determine which model is suitable for a particular task.

With its longer reach, the PUMA 761 is ideally suited for precise, repetitive tasks such as arc welding and sealant dispensing. The PUMA 762 performs high-precision material handling, machine loading, inspection, testing, joining and assembly in medium and heavier weight applications. The PUMA robots occupy minimal floor space, yet a large work envelope allows the robots to service multiple machines and work surfaces.

Each axis motion is generated by a brush type DC electric motor, with axis position feedback generated by incremental encoders. As shown, the wrist is provided with three articulations, i.e., an up/down rotation indicated by arrow 21 and a left/right rotation indicated by arrow 22 and a third motion indicated by arrow 23. Elbow and shoulder rotations in the up/down direction are respectively indicated by arrows 24 and 25. Finally, a left/right arm rotation on a base 27 is indicated by arrow 26.

ROBOT CONTROL

The present invention is directed to a robot control 30 (FIG. 2, 3, or 6) which can operate the robot 20 of FIG. 1 and other Unimation robots including the larger 860 robot which employs brushless DC axis motors and absolute position feedback. Generally, however, the robot control 30 is universally and flexibly applicable to differing kinds and sizes of robots in stand alone or robotic network operation.

As a result of its universality, the control 30 can be arranged to operate a complete family of robots. Thus, all hydraulically and electrically driven robot arms manufactured by Unimation, a company of Westinghouse, assignee of the present invention, can be operated by the control 30. The key to the family usage, or more generally the universality of the control 30 lies in modularization and in minimizing the use of arm dependent hardware and avoiding the use of any arm dependent hardware in as much of the modular control structure as possible. The robot control 30 is identified by the acronym UNIVAL and operates with completely digital servo control to provide better robot performance with lower cost.

OVERVIEW OF CONTROL ARCHITECTURE

Figure 4:
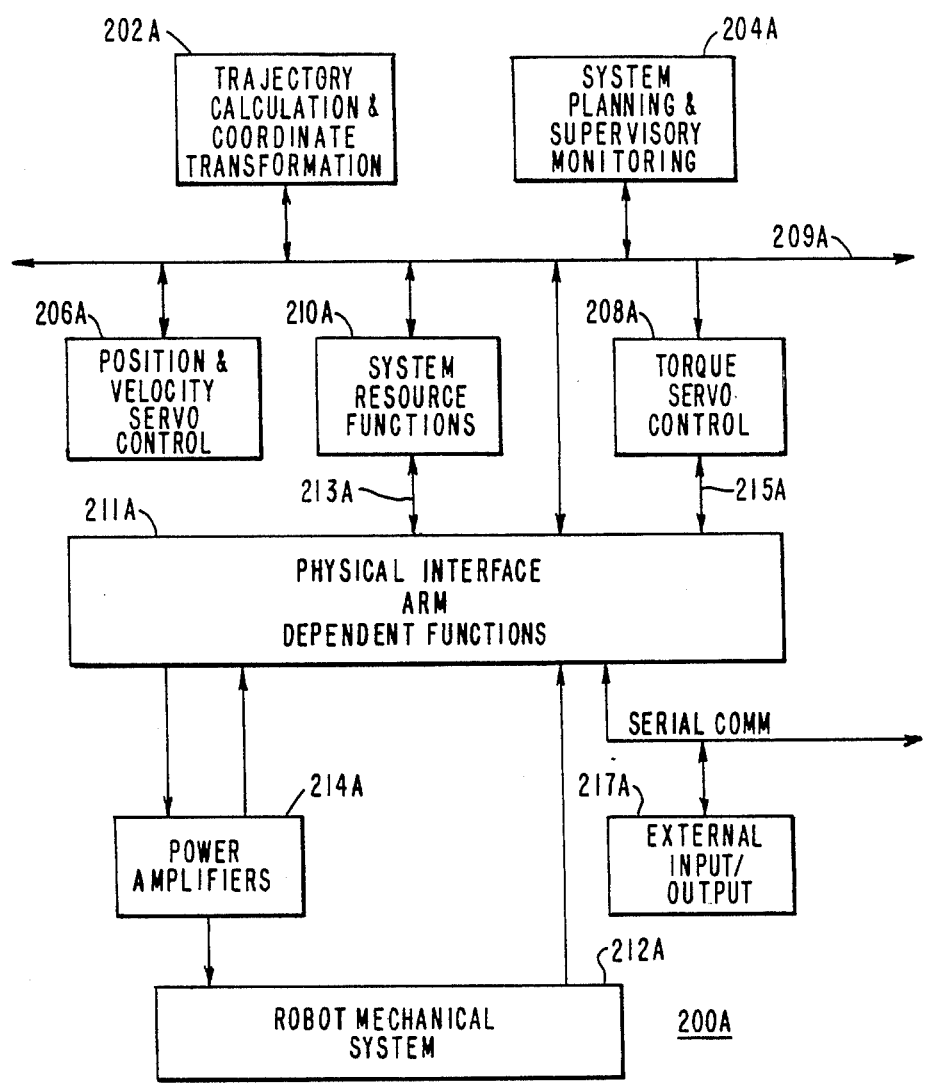
FIG. 4 shows a functional block diagram of a robot control architecture arranged in accordance with unique hierarchical, modular, and communication concepts.

A basic robot control system architecture 200A (FIG. 4) enables provision of all functions needed for modern, intelligent robot controls to be implemented in a base set of modules. The architecture 200A thus provides a highly modular organization of control and sensory systems with communications between system modules and tasks occurring through well defined interfaces. The partitioning of the basic control system into well defined functional levels and functional areas within each level enables high performance robot control to be achieved efficiently yet makes the control highly accommodating to modification with advancing technology.

As new features or algorithms are developed, required changes in the robot control are structurally defined by the control system partitioning. Standard interfacing between hierarchical levels enables changes to be made at any level without affecting other system modules. Functional subsystems can be added to the basic control system without requiring redesign of the base system or existing modules. Thus, increased performance or increased functional capability is achieved with convenience and economy.

More particularly, the robot control architecture 200A includes command/supervisory blocks 202A and 204A which respectively provide (1) trajectory calculations and coordinate transformations; and (2) system planning and supervisory system monitoring. Commands are implemented by a position/velocity control block 206A, a torque control block 208A and system resource functions 210A. Intermodule communication is performed over a system trunk 209A and preferably direct trunks 213A and 215A.

Arm dependent and other functions are provided in a physical interface 211A to the robot mechanical system 212A and its power amplifiers 214A. Communications with external input/output devices 217A and other controllers or computers are executed through the physical interface 211A. Communications capability is a basic system resource included in the system resource functions 210A.

Figure 5:
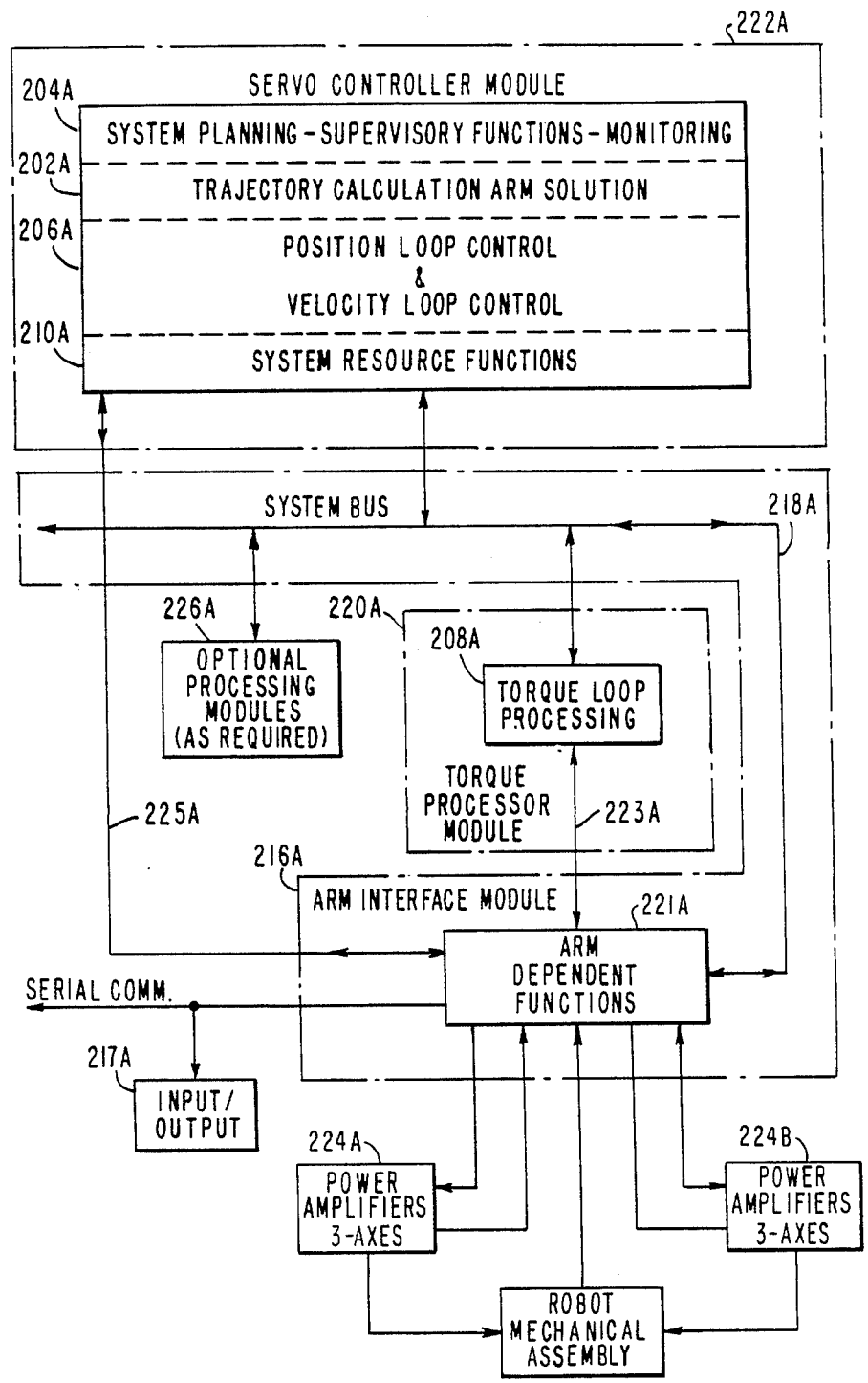
FIG. 5 shows a hardware control block diagram which embodies the architecture of FIG. 4.

Mapping of the control functional architecture to hardware modules is shown in the diagram of FIG. 5. Thus, an arm interface module (AIF) 216A at the lowest board hierarchical level includes the arm dependent functions 221A and provides system bus circuitry 218A corresponding to the trunk 209A of FIG. 4.

A torque processor board 220A provides torque loop control at the next higher board hierarchical level. The AIF board is also interconnected to the power amplifiers 224A, 224B and the robot mechanical assembly as shown.

A servo control board (SCM) 222A is employed at the highest board hierarchical level of the basic robot control to implement velocity and position control 206A in one of its functional areas, system resource functions 210A in another of its functional areas, and command/supervisory functions 202A and 204A in another of its functional areas.

The system bus 218A interconnects the AIF board 216A with the TP and SCM boards 220A and 222A. Additional direct buses 223A and 225A connect the AIF board 216A with the TP board 220A and the SCM board 222A, respectively. The bus connections provide the intermodule communications needed within the control architecture in accordance with the invention. Reference is made to U.S. Ser. No. 932,982 which is directed to the packaging aspects of the robot control board interconnections.

Optional processing modules 226A can be connected to the system bus 218A to expand the basic robot control or to provide additional features or additional interfacing for the basic robot control. For example, a system control board referred to subsequently herein can be connected to the system bus 218A to perform the command and supervisory functions and thereby enable the basic robot control to have greater available computing capacity and provide higher levels of robot control performance. Reference is made to Ser. No. 932,991 which is directed to this system feature.

OVERVIEW—ELECTRONIC BOARDS

Implementation of the looping for the robot control 30 is achieved by the use of digital control circuitry disposed on a plurality of electronic boards. The organization of the circuitry on the boards and the partitioning of programming among various microprocessors enables advanced robot control performance to be achieved with a modular control configuration characterized with economy of manufacture, facilitates variability of configuration which enables universality of use, and flexibility in choice of level of control performance.

Figure 6:
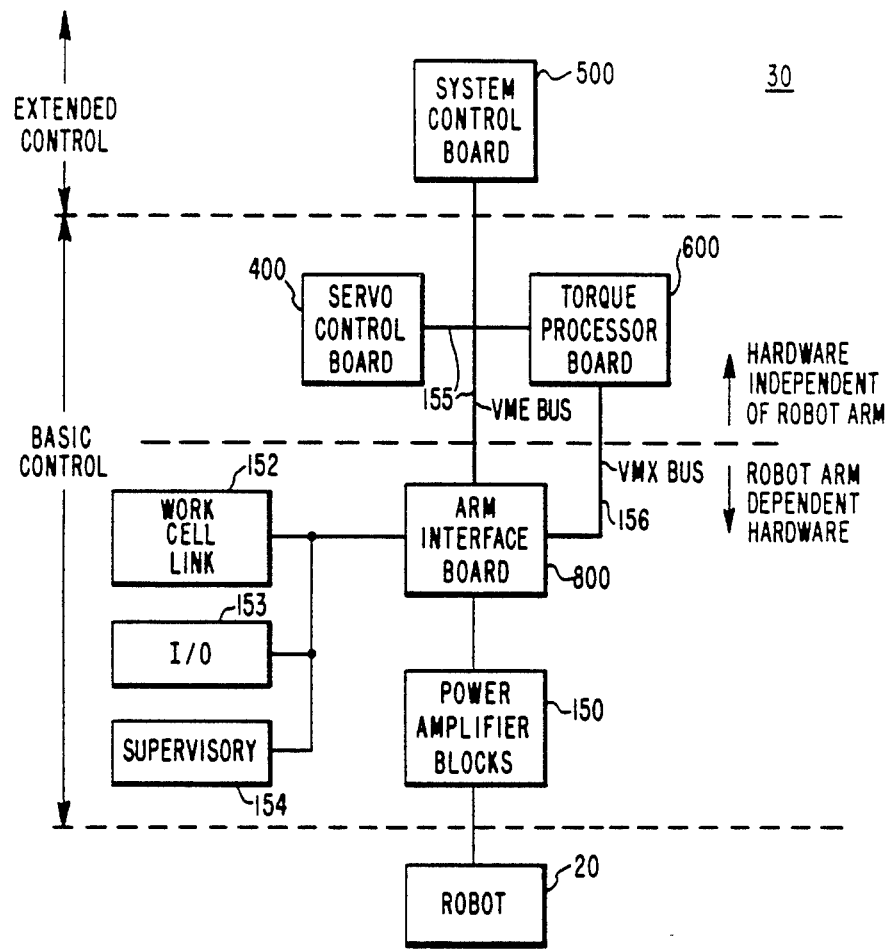
FIG. 6 shows an overview of an arrangement of electronic boards on which circuitry is arranged to implement the robot control system including the pulse width modulation circuitry of the present invention.

As shown in FIG. 6, the control board configuration includes an arm interface board 800 which preferably houses all circuitry dependent on the type of robot arm being controlled. For example, position feedback circuitry will differ according to whether absolute or incremental position feedback is used by the robot arm to be controlled. Thus, two or possibly more varieties of the arm interface board 800 can be employed to provide digital control systems for any of a variety of different sizes or types of robot arms. Any particular robot arm would require use of the arm interface board which is structured to work with that robot arm.

The arm interface (AIF) board 800 also houses generic circuitry such as VME bus control circuitry which is generally related to two or more boards and not to any one board in particular.

Control signals (pulse width modulated) are generated from the AIF board 800 to control power amplifier blocks 150 which supply motor currents to the robot joint motors. The AIF board 800 also operates as a channel for external coupling of the robot control 30 to other robot controls in a work cell as indicated by the reference character 152, to programmable controllers and other input/output devices 153 in an area network and to higher level computers 154 for supervisory control.

A torque processor (TP) board 600 and a servo control board 400 are generic circuit boards used with the AIF board 800 and power amplifier blocks 150 in all robot control systems for all robot types. The three circuit boards 400, 600 and 800 provide complete 6 axis control for a robot arm and thus form a basic control configuration for the UNIVAL family of robot controls as well as other robot controls.

The torque processor board 600 provides motor torque control in response to commands from the servo control board 400. In turn, the servo control board 400 provides arm solutions and position and velocity control in accordance with a robot control program.

Extended control capability and/or system functioning is achieved by interconnecting additional electronic boards or devices to the basic control 400, 600, 800. For example, with the addition of a system control board 500 and partitioning of predetermined program functions including the arm solutions from the servo control board 400 to the system control board 500, the UNIVAL TM robot control can operate the robot 20 and other robots with significantly faster control action, i.e., with a trajectory cycle shortened from thirty-two milliseconds to eight milliseconds.

Interboard data communications for control and other purposes occur over multiple signal paths in a VME bus 155. Additionally, a VMX bus 156 is provided for connection between the torque processor board 600 and the AIF board 800.

Multiple pin interconnectors (not shown in FIG. 6) are provided on the AIF, TP and SCM boards and any other connectable units to facilitate VME and VMX interboard bus connections modular and board assembly for the robot control 30. Other connectors are provided on the AIF board 800 for external input/output connections.

More detail on the board circuit structure is presented herein or elsewhere in the writeups for the cross-referenced patent applications.

BASIC ROBOT CONTROL—SERVO CONTROL BOARD

SERVO CONTROL BOARD

A servo control module (SCM) or board 400 (FIGS. 6, 7A-1, and A-2) is structured in accordance with the modular architecture of the robot control system to operate as a core board for a complete basic robot control and generate arm solutions from stored robot program commands or to operate as part of an expanded robot control and receive for implementation arm solutions produced from robot program commands by the higher level system control board 350. The generation of arm solutions involves the execution of robot control functions including robot program language interpretation, path planning, trajectory calculations (intermediate position commands and axis coordination) and transformation of position information between Cartesian and robot joint and robot tool coordinate systems. The SCM board 400 additionally provides communications interfacing with related peripherals and a host controller if provided.

The SCM board 400 is provided with program controlled digital circuitry to implement arm motion control loops for the robot control system. Motion control is achieved for each axis through a control loop arrangement which preferably includes interrelated position, velocity, and acceleration control loops from which torque commands are developed for implementation by the torque processor module 600. The digital servo control is a coordinated multiprocessor servo control that generates output torque commands from (1) position and velocity commands provided for each axis by the arm solution and (2) position and velocity feedback signals obtained from the position encoders and the tachometers through the arm interface module 800.

In the SCM control loop operation, a position error is calculated for each axis from the applied axis position command and the axis position feedback. A velocity error is calculated for each axis from a velocity command derived from successive position commands and from the axis velocity feedback. Preferably, the position and velocity control loops are operated in parallel, i.e., the position and velocity errors are summed to produce a torque command for the torque control loop on the torque control module 600. Additionally, an acceleration command preferably is derived from successive velocity commands and applied in a feedforward acceleration control loop which generates an acceleration based torque command for summation with the position and velocity errors in generating the SCM output torque command.

The frequency with which loop calculations are made is selected to produce robot arm motion which is fast, accurate, smooth and stable. For example, the frequency employed can be such as to provide a trajectory cycle of 32 milliseconds as in the present case. If desired, a faster trajectory cycle, i.e., as short as 8 milliseconds, can be achieved.

SCM DIGITAL CIRCUITRY

Figures 1, 7A:
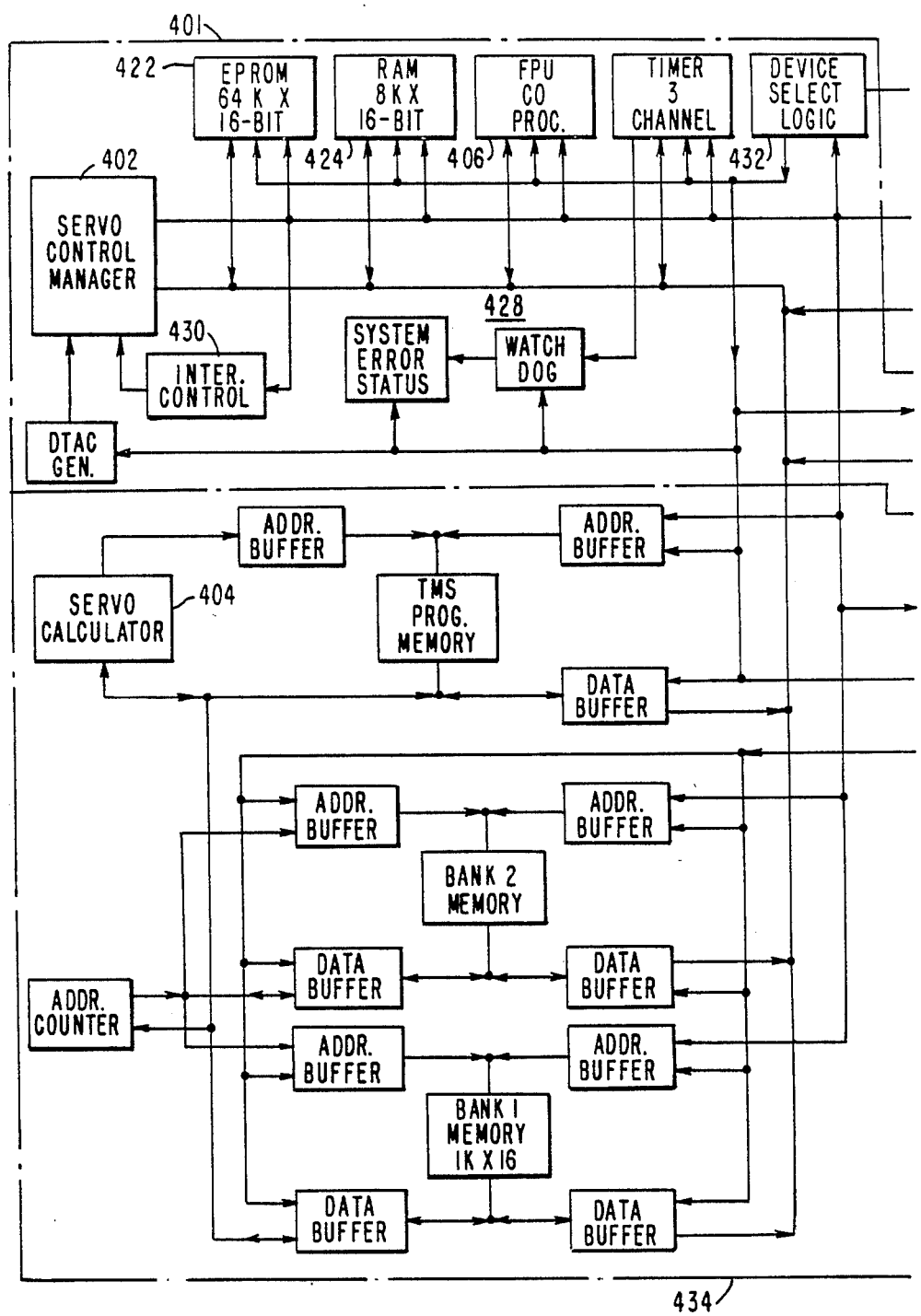
Figures 2, 7A:
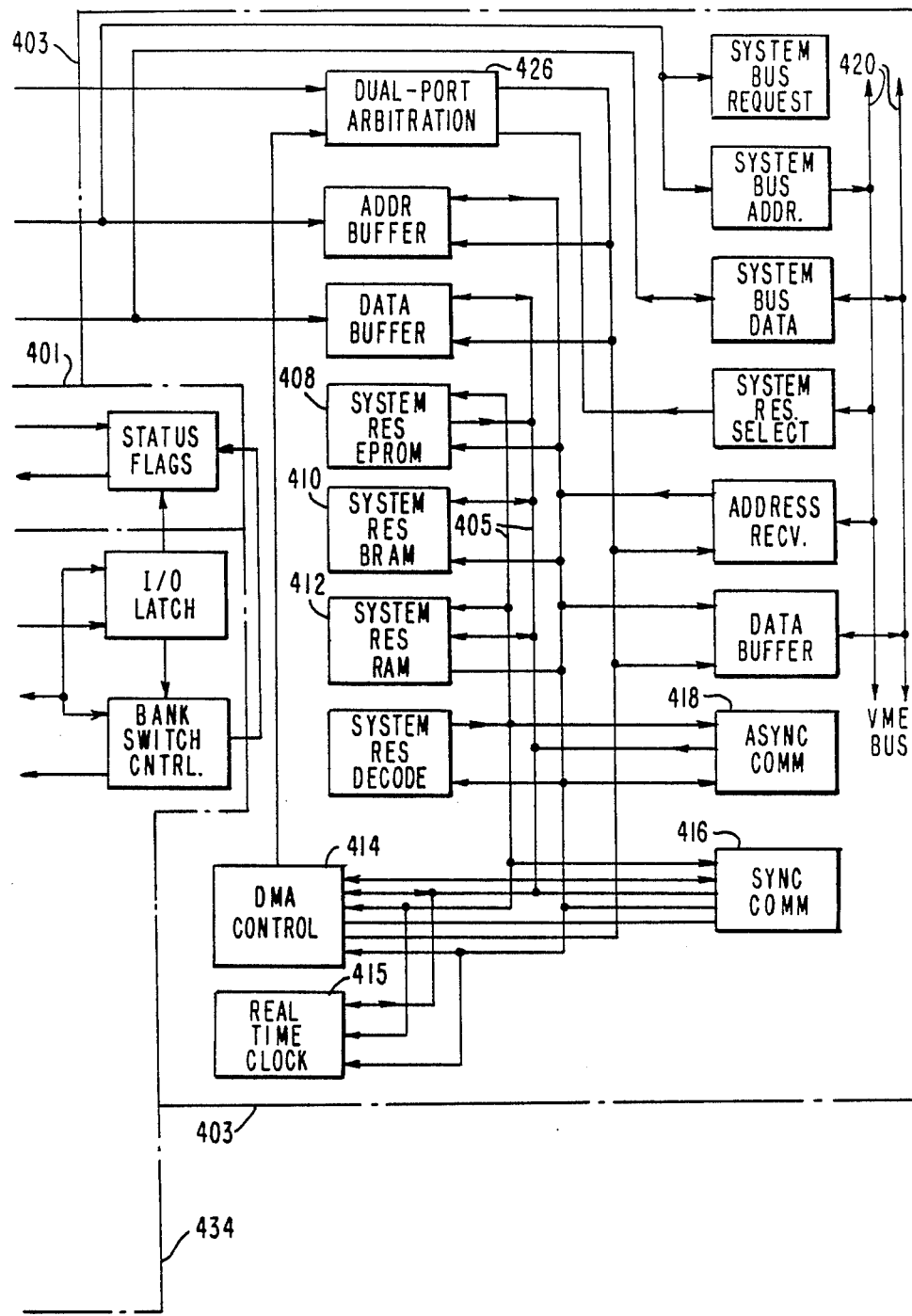
Figures 2, 8A:
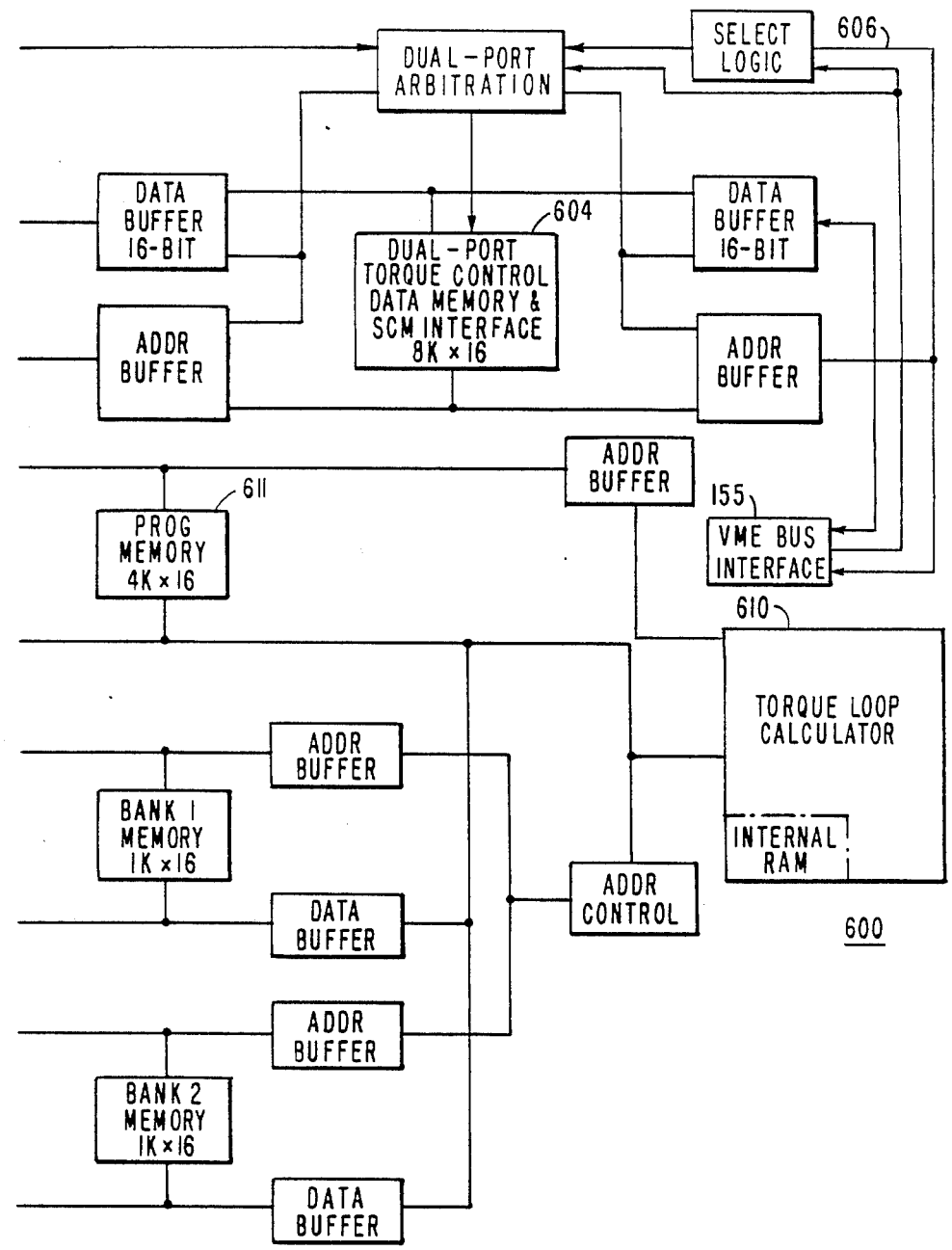

As observed in FIGS. 7A-1, A-2, the SCM board 400 generally comprises two sections, i.e., a local processor section 401 and a system resource section 403. The system resource section 403 employs a bus 405 and provides functions related to the overall robot control system and not specifically related to execution of the position and velocity control loops.

These functions include EPROM 408 for storage of the robot arm solutions, battery backed-up RAM 410 for storage of non-volatile data, static RAM 412, real-time clock 415, a DMA controller 414 and two multi-protocol, dual channel communications controllers 416 and 418.

The system resource area is implemented as dual-port memory. As such, equal access to the system resource section is provided from either a local processor 401 or from the VME bus. The system resource functions appear as a bus slave to the VME bus. This provides the capability for these related functions to be controlled either from the SCM local processor, or from an optional processor connected to the system bus.

In the local processor section 401, the SCM digital circuitry includes coordinated digital coprocessors and interface and resource circuitry needed for specified performance, i.e., to provide control calculations and control data management needed for accurate and efficient control of all axes and to provide interfacing communication with a host controller, peripheral devices and other robot controllers. Preferably, a servo control manager 402 operates with a servo calculator 404 which functions as a slave processor principally to make position and velocity control loop calculations (i.e., feedback filters, loop gains, position and velocity errors, etc.).

The servo control manager 402 directs control, status and program data to and from the SCM board 400 and to and from the servo position/velocity control calculator 404. The servo control manager 402 can be a Motorola 68000 which has a high data processing capability. By separating data management and control calculation tasks in accordance with the respective capabilities of the processors 402 and 404, a basic circuit organization is provided as a basis for achieving substantially improved control performance with manufacturing and user economy.

In the illustrated embodiment, implementation of the local processor section of the SCM board 400 is based on usage of a 68000 processor as the servo control manager 402 and two coprocessors. Both coprocessors serve as peripheral devices to the 68000. One of the coprocessors 406 (preferably National Semiconductor 32081), provides floating-point calculation capability when arm solutions are to be provided by the SCM board 400. The other coprocessor, or slave processor, is the position/velocity servo calculator 404 and is implemented with a Texas Instruments TMS-32010 Digital Signal Processor. The position/velocity processor provides high speed fixed point calculation capability.

The remaining functions which are a part of the local processor section include local memory, both EPROM 422 and RAM 424, a peripheral timer/counter device, interrupt control 430, and system error monitoring devices 428. The servo control manager 402, local processor 401 can serve as a master to the VME bus for access to the TPM or other related type functions. However, the SCM board 400 does not provide VME bus system controller type functions which normally include system reset generation, bus arbitration for access to the bus and system bus clock generation, since these functions are implemented on the arm interface board 800.

The SCM board 400 is arranged to provide as much systems flexibility as is reasonably possible, and to obtain the maximum performance from available large scale integrated (LSI) circuitry. This is one of the reasons that the DMA and communications facilities are implemented in the system resource area as opposed to being directly connected to the local processor bus. This architecture not only frees the servo control manager 400 from direct intervention in communications data movement, it also eliminates the local processor bus communications related overhead, thus allowing high speed serial communications to be conducted without significant impact on program execution time in the servo control manager 400. Also, by placing these functions in the system resource area, these facilities can be operated by any other optional processor with capability of serving as a VME bus master. This would then totally free the servo control manager 400 from communications related processing. This organization allows the complete functionality required for a robot control system to be implemented in a cost effective manner and on a minimal set of boards while also allowing increased performance controllers to be implemented without impacting the overall system design.

Another significant area is the interface between the servo control manager 402 and the servo calculator 404. Here, a special dual port memory organization, referred to as "ping-pong" or "bank switched" memory allows either processor to communicate with the other without impacting the processing performance of either processor.

PROGRAMMED OPERATION OF SERVO CONTROL BOARD

Figure 10A:
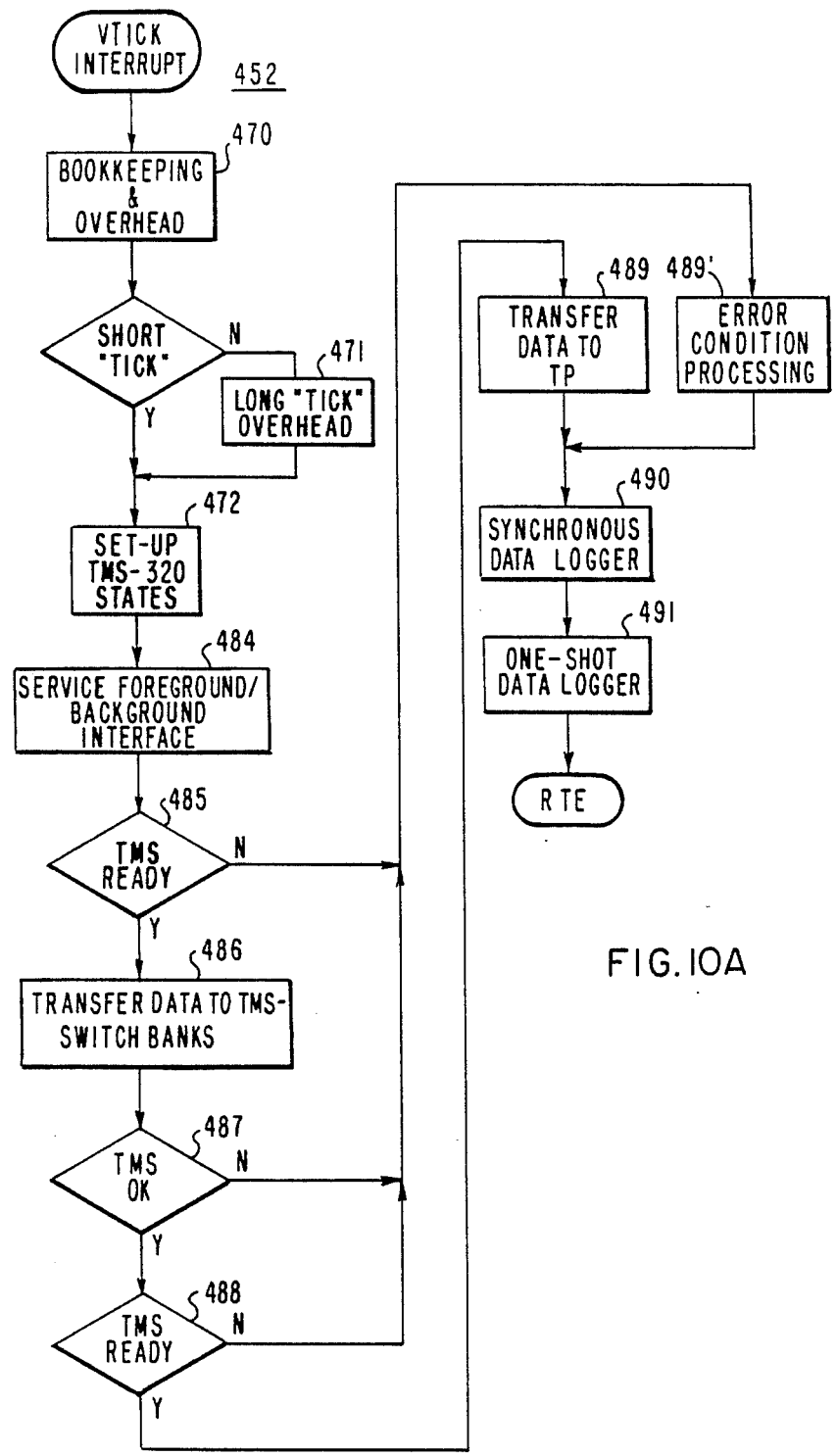

As schematically shown in FIGS. 10A through 10H, the program system for the servo control data manager 402 of FIG. 7A-1 comprises a background program 450 in FIG. 10B called MAIN and a cyclically operated foreground interrupt routine 452 called SERVO. When the system is started as indicated to RESET, an initialization routine 453 is executed prior to continuous running of the MAIN program 450. In addition to the cyclically executed SERVO interrupt 452, an interrupt routine 454 called C&UNEX operates in the foreground on demand to process unscheduled or unexpected interrupts. Further, a special highest priority routine 457 called the watch dog timer interrupt functions in response to operation of the external watch dog hardware.

Where the robot control system includes the system control board 500 in FIG. 6 for higher performance through higher computing capacity, the MAIN program provides for receiving and distributing position commands from the system control board 500. In the minimum or basic robot control system configuration, the system control board 350 is not included and the MAIN program 450 further performs arm solutions to generate position commands locally on the servo control board 400. Additional description on the minimum robot control is presented subsequently herein.

Figure 10E:
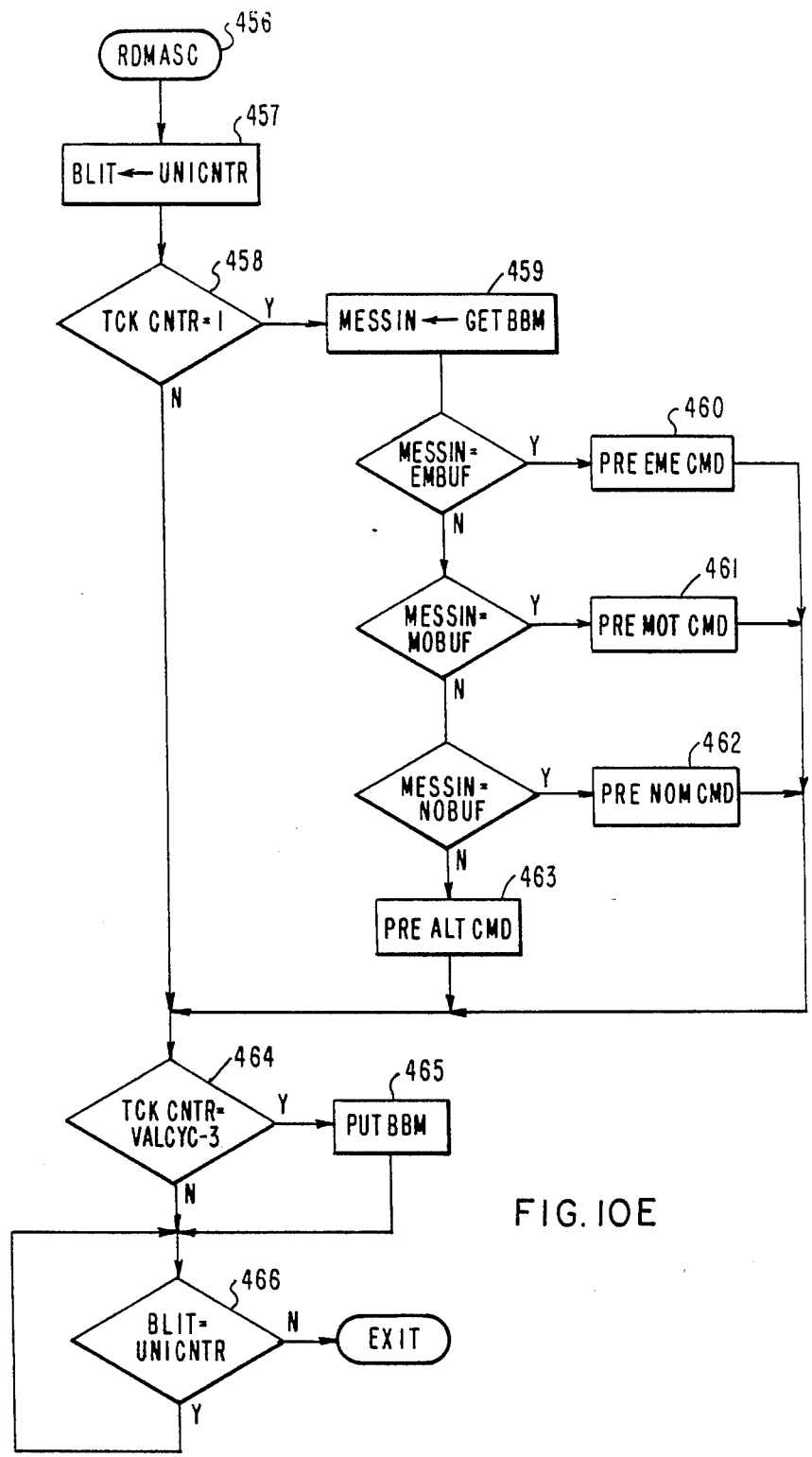
Figure 10F:
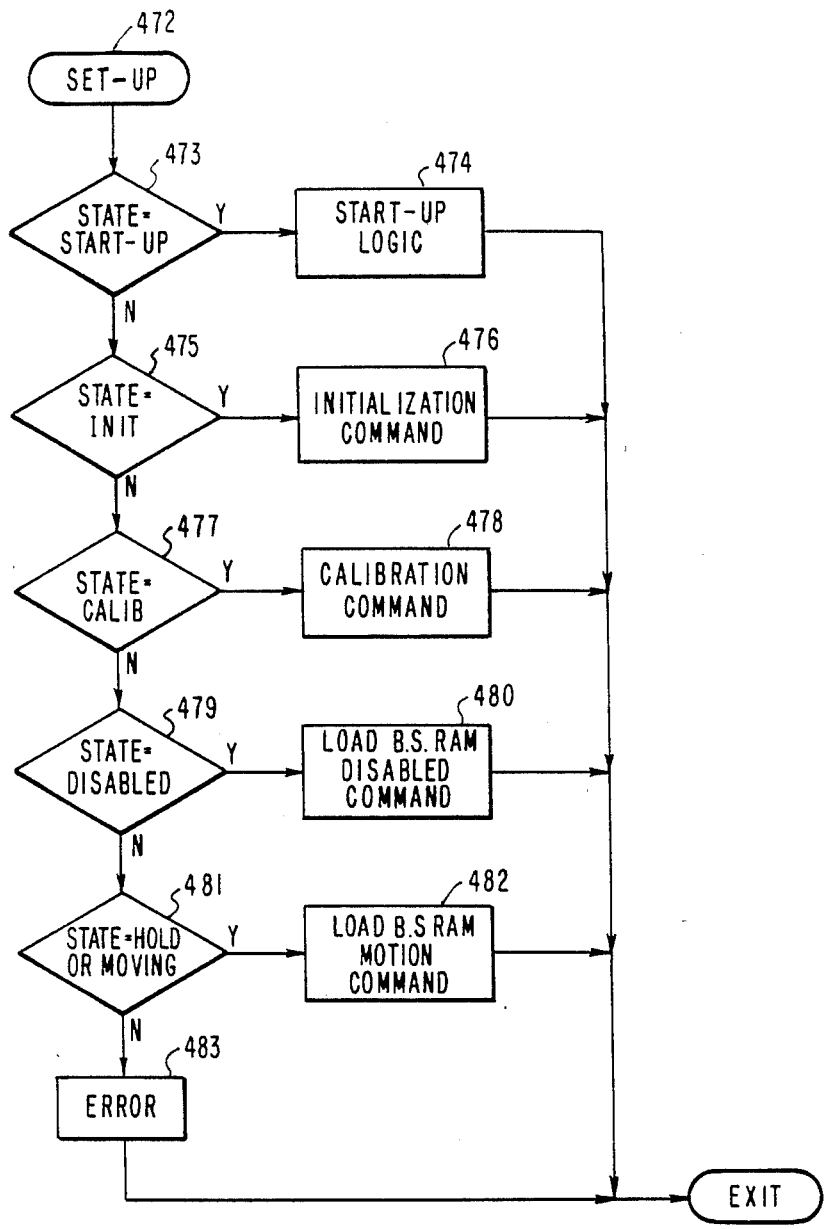
Figure 10G:
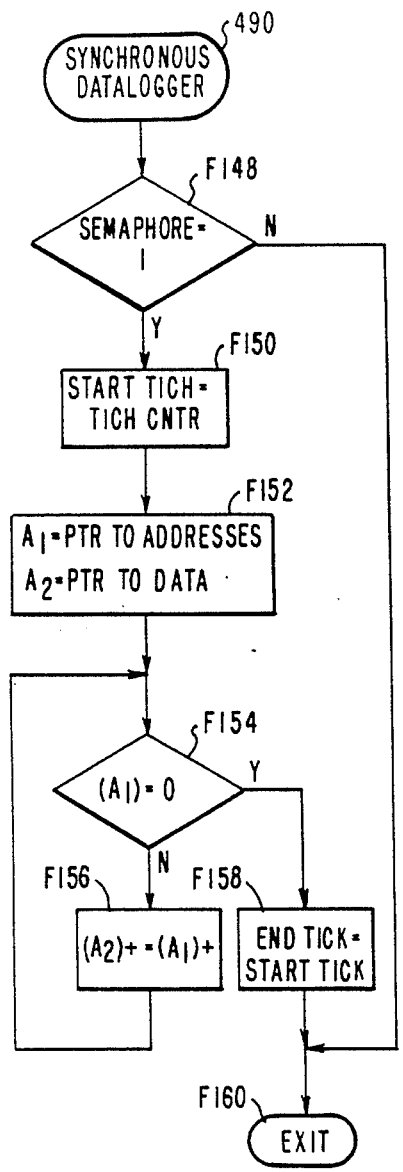
Figure 10H:
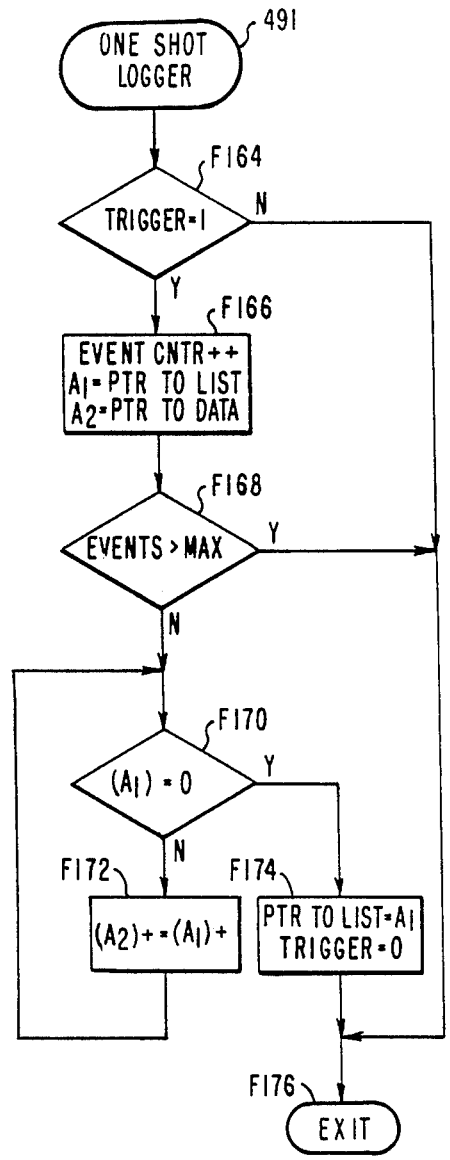

The rate at which the MAIN program 450 is interrupted for the cyclical execution of the SERVO routine 452 is controlled by the signal VTICK generated once each millisecond on the VME bus 155 from the arm interface board 800. The basic functions provided by the SERVO routine 452 better seen in FIG. 10A, are:

(1) transfer control data to and from the servo calculator 404;

(2) transfer control data to and from the torque processor board 600;

(3) receive sensor feedback data over the VME bus 155 from the arm interface board 800;

(4) interface 456 to the supporting background task RDMASC in FIG. 10E;

(5) perform E146 synchronous data logging in FIG. 106;

(6) perform E162 one shot data logging in FIG. 10H;

(7) place broadcast data in a blackboard storage area;

(8) shut the system down if serious error conditions occur.

In the servo calculator 404, two basic functions are performed. First, downloaded position command data is interpolated for each of the 31 ticks between long ticks in the VALCYCLE, and velocity and acceleration command data are computed from the position command data for each tick. Next, servo calculations are made for each axis after each tick for the position, velocity and acceleration commands then applicable and the concurrently received position and velocity feedback. As a result, a torque command is computed for each axis after every tick for execution by the torque processor board.

The control algorithms executed by the servo calculator are described in greater detail in W.E. 53,424.

The initialization routine is shown in greater detail in FIG. 10C. The process essentially comprises the performance of a series of tasks as indicated in the successive blocks in FIG. 10C. The following list provides further information on the nature of these tasks:

| TASK | INITIALIZATION |
| --- | --- |
| INISRC | bit-bus emulator for handshake |
| INSCROM | feedback interface |
| INIFIX | global variables |
| INCONF | robot default configuration |
| INTMS | servo calculator-download program store |
| INIAIB | torque processor board 600 |
| INROB | robot software configuration |
| INJTMS | bank switch memory |
| INJONT | joint data structure via servo calculator program memory and torque processor board shared RAM reads |
| INBUF | internal buffer management areas |
| INIDLC | one shot and synchronous data logger interface |
| CRTINI | input/output hardware-servo control board 400 |
| BBINIT | bit-bus emulator interface and handshake with system control board 500 |

Once the system is initialized, the MAIN program 450 (FIG. 10D) begins continuous cyclical background execution. As shown in FIGS. 10D and 10E, a routine 456 called RDMASC is run to provide ongoing reading of system position commands from the bit-bus emulator which is a designated memory area in shared RAM where system commands are deposited when received from the system control board 500.

Viewed as a whole, the background and interrupt routine can take on the following finite servo states:
0—Start-up state
1—Initializing state
2—Calibrating state
3—Servo disabled state
4—Servo enabled, hold state
5—Servo enabled, moving state.

The background task is responsible for assuring that valid state transitions occur, and for sequencing the interrupt task to new states. The interrupt task is therefore written to accept "commanded" states and to supply "current" states. In addition, the background task is sequenced via commands from the bit-bus emulator. The following state transition table defines this operation:

| Current State | Command ID from bit-bus | | | | | | | | | |
| --- | --- | --- | --- | --- | --- | --- | --- | --- | --- | --- |
| | 36 | 17 | 45 | 1 | 16 | 34 | 20 | 2 | 18 | 46 |
| 1 | $-1$ | $-1$ | $-1$ | $-1$ | $-1$ | 2 | $-1$ | $-1$ | $-1$ | $-1$ |
| 2 | $-1$ | 3 | $-1$ | $-1$ | $-1$ | 2 | $-1$ | $-1$ | $-1$ | $-1$ |
| 3 | 3 | 3 | 3 | 4 | $-1$ | $-1$ | $-1$ | 3 | $-1$ | 3 |
| 4 | 4 | $-1$ | $-1$ | 3 | $-1$ | $-1$ | 5 | 4 | 4 | 4 |
| 5 | $-1$ | $-1$ | $-1$ | 3 | 4 | $-1$ | 5 | $-1$ | $-1$ | $-1$ |

Where a "$-1$" indicates an illegal state transition. The bit-bus commands are defined as follows:
36—Where command
17—Calibrate command
45—Install servo parameters command
1—Enable/disable servos command
16—Hold command
34—Initialize command
20—Normal motion command
2—Brake command
18—Limp command
46—Upload current servo parameters command.

Generally, a set of position commands is generated for the servo loops once each Valcycle, in this case once every 32 milliseconds. In turn, each Valcycle is measured by Vticks which are generated on the VME bus once every millisecond. There are thirty-two (32) Vticks in each VALCYCLE in this case.

A cycle counter named TCKCNTR counts the Vticks in each VALCYCLE. A running counter called UNICNTR keeps a summing count on Vticks up to $2^{31}$ ticks.

When the next previous VALCYCLE has been ended as indicated in FIG. 10E by the UNICNTR in block 457, block 458 operates on the beginning of the new VALCYCLE when TCKCNTR=1 to initiate reception of the new set of position commands for the new VALCYCLE. Thus, block 459 reads the new commands from the bit-bus emulator.

If the command includes an emergency command (such as disable servo), block 460 directs the emergency command to an emergency command buffer. Block 461 sends motion (position) commands to a motion command buffer. Similarly, block 462 sends the non-motion commands to a non-motion command buffer.

The blocks 460, 461 and 462 perform similar basic system functions. First, the command is read from the Bit-Bus emulator in shared RAM. Next, prescribed checks are made to validate the command. Finally, the command is routed to the designated buffer in local non-shared internal RAM.

If no direction is found to transfer a system command to an internal RAM buffer, block 463 records a no command error and prepares an alternate command (same as last command or a shutdown if this is the second occurrence of this no command error).

Next, blocks 464 and 465 send a response to the system control board 350 that the newest command has been received when the value of the tick counter nears the end of the current VALCYCLE, i.e., when it equals the VALCYC minus three. Block 466 next repeatedly polls UNICNTR until RDMASC is to be re-executed to receive the next system command.

When a VTICK occurs (i.e., once every millisecond), RDMASC is temporarily interrupted for execution of the SERVO routine 452. As shown in the flowchart in FIG. 10A, the SERVO routine 452 first performs needed bookkeeping and overhead tasks as indicated in block 470. For example, the watchdog timer is reset for the 2 millisecond interrupt. If the tick is a long tick, i.e., the tick counter equals one to mark the start of a new VALCYCLE, block 471 performs additional overhead tasks. The basic functions performed are: reset tick counter to 1; route the new position command from the system control board to the servo calculator; and process changes of state in the SERVO routine.

LOADING DATA FOR SWITCHING TO THE SERVO CALCULATOR

If the tick is a short tick, i.e., an intermediate tick in the 32 tick cycle, or after long tick overhead has been performed, block 472 prepares for transferring data to the servo calculator by loading data to the bank switched memory according to the state in which the servo calculator is to be.

The flowchart in FIG. 10F shows the servo calculator setup in greater detail. If block 473 finds the calculator is to be in the start-up state, block 474 fetches data needed for start-up logic for downloading to the servo calculator 404 in FIG. 7A-1. For the initialization state, blocks 475 and 476 fetch initialization command data for downloading to the servo calculator 404. Similarly, calibration command data is readied for the servo calculator 404 by blocks 477 and 478 for the calculator calibration state.

If the calculator is to be disabled, blocks 479 and 480 load into the bank switched memory a disabled command. Finally, if the calculator state is to be "Hold" or "Motion", which covers most of the operating line, blocks 481 and 482 load motion command data into the bank switched memory. If none of the listed states are detected, block 483 records an error.

DATA FLOW AND TIMING

Figure 11B:
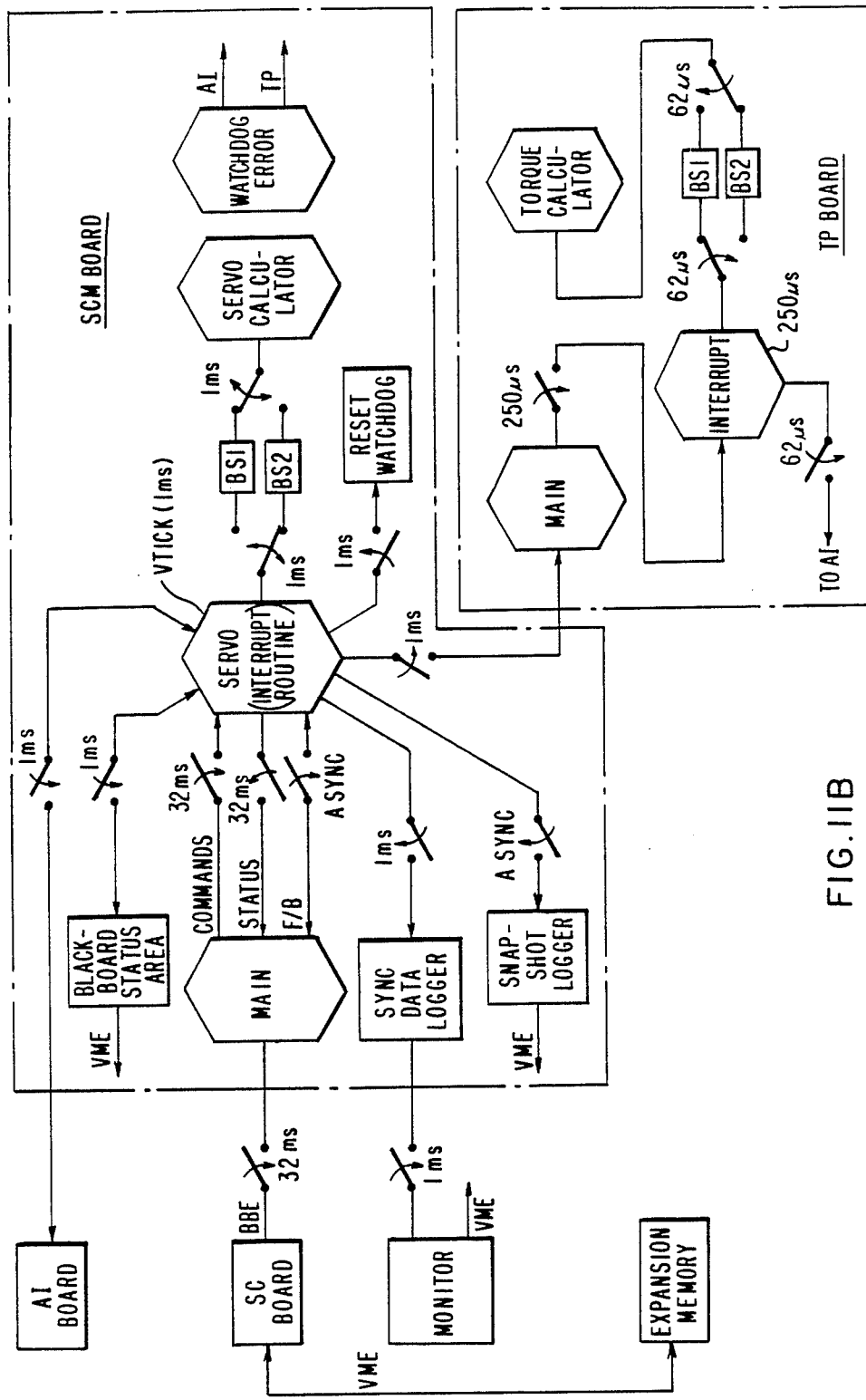
FIG. 11B shows a data flow and timing diagram for the SCM and TP boards.

In the HOLD/MOTION state, control data generally flows as follows as seen in overview FIG. 11B. Once every VALCYCLE, i.e., once every 32 milliseconds in this case, position command data for all axes is received by the servo control board main program from the system control board and shuttled through the bank switch memory to the servo calculator. Feedback data (position and velocity) is generated for each axis every millisecond and it is transferred to the servo calculator through the bank switched memory every millisecond by the servo control data manager through operation of the servo interrupt routine.

The servo calculator computes a torque command every millisecond for each axis from the command and feedback data. In turn, the torque commands are transferred every millisecond by the servo control data manager from the bank switched memory to the torque processor board. On the TP board, torque calculations based on torque commands and current feedback are performed to generate motor voltage commands for all axes every 250 microseconds.

SWITCHING DATA TO THE SERVO CALCULATOR

After completion of the setup subroutine 472 in FIGS. 10A and 10F, block 484 performs whatever data transfer service is needed for the foreground/background interface within the servo control data manager of FIG. 7A-1.

"MAILBOX" INTERFACE FOR 68K FOREGROUND/BACKGROUND TASKS

In order to use effectively the interrupt routines in the 68000 microprocessor (68K) of servo control manager 402 it has become necessary to perform various asynchronous "setup" operations in the background task, while using the foreground task(s) to initiate the changes. This approach allows the foreground tasks to have complete control of subordinate processors and devices. It also allows the less time critical setup to be spread out over several servo cycles. (In this discussion background refers to the non-interrupt task.)

A shared RAM mailbox interface was chosen to allow the background routine to communicate a list of tasks to be performed by the foreground routine. Each task request is encoded into a "packet" which contains the information required by the foreground task. The packet structure was designed to be simple yet as generic and efficient (in terms of decoding and execution time) as possible. The following table describes the format of the interface:

| Offset (bytes) | | Contents |
|---|---|---|
| 0 | | Semaphore byte (1=Full, 4=Empty) |
| 1 | | Number of Packets (requests) |
| 2-3 | | \| → Command Field |
| 4-5 | first | \| Message size (number of 16-bit words) |
| 6-9 | packet | \| FROM Address Field |
| a-d | | \| → TO Address Field |
| e-15 | Second packet | (items 2-d from above) |
| 16-1d | Third packet | |

For the servo interrupt routine the elements in each packet are interpreted as follows (descriptions assume a single packet is presented):

Command Field (CF):

CF > O : TMS 320 servo command
 *Load CF into the TMS command list (see "TMS Ping-Pong Memory Map")
 *copy "message size" words from "FROM" and append to the TMS input buffer.
 *set semaphore byte to "empty"

CF = O : Transfer data command
 *copy "message size" words from "FROM" to "TO"
 *set semaphore byte to "empty"

CF = −9999 : TMS reset command (allows direct writes to TMS program memory)
 *disable (level 5 - VTICK) interrupts
 *put TMS into reset state
 *copy "message size" words from "FROM" and "TO"
 *remove reset state from TMS
 *set stick to bank O
 *enable (level 5 - VTICK) interrupts
 *set sempahore byte to "empty"

CF − O : Multipass TMS 320 servo command
 *set CF = −CF
 *Load CF into the TMS command list
 *copy "message size" words from "FROM" and append to the TMS input buffer.

-continued

*DO NOT set semaphore byte to "empty".

Notes:
*In order to avoid time consuming packet management for multipass commands, ALL packets will be reprocessed on the second pass if ANY packet is of type Multipass.
*Because resetting the TMS results in automatically switching to bank O (which may not be the bank earlier packets were stored in), the TMS bank memory is NOT switched if a TMS reset command is present. Therefore these commands should be sent seperately.
*Currently 300 (hex bytes of system resource RAM is set aside for the mailbox area and for free space to store the data. The following list of suggested global symbol names further defines the area.

List of Global Symbols

| | | |
|---|---|---|
| FB_SHR | 0x34900 | /* shared ram base address /* to start of foreground/ /* background semaphore /* area */ |
| FB_SEM | 0x0000 + FB_SHR | /* ptr to FB semaphore /* byte */ |
| FB_NOP | 0x0001 + FB_SHR | /* ptr to number of packets /* (byte) */ |
| FB_CF | 0x0002 + FB—SHR | /* ptr to the first command /* field */ |
| FB_MAX | 0x0004 | /* maximum number of /* packets allowed */ |
| FB_DAT | 0x0032 + FB_SHR | /* ptr to area of free space /* to store data to /* be transferred to fore- /* ground task */ |
| FB_MXD | 0x02ce | /* maximum size of /* FB_DAT in bytes */ |
| FB_EMPTY | 0x04 | /* no command list */ |
| FB_FULL | 0x01 | /* command list present */ |

If block 485 in FIG. 10A detects that the TMS servo calculator 404 of FIG. 7A-1 is ready, block 486 transfers the previously prepared position command and/or other data to the calculator 404 through the ping-pong memory 434. If the block 485 or block 487 finds that the servo calculator 404 is in a defective state, an error shutdown is commanded. The following command list provides greater detail on the data transferred to the servo calculator.

Ping-Pong Memory Map

| Addresses | | | |
|---|---|---|---|
| 68k | TMS | Symbol | Contents |
| 3c000–3c007 | 0–7 | TMSCOM | TMS Command List |
| 3c010–3c09f | 8–4f | TMSIN | TMS Input Buffer |
| 3c0a0–3c0ff | 50–7f | TMSSTA | TMS Status Buffer |
| 3c100–3c11f | 80–8f | TMSTOR | TMS Torque Output Buffer |
| 3c120–3c21f | 90–10f | TMSLOG | TMS Logged Data Buffer |
| 3c220–3c7ff | 110–3ff | TMSGC | TMS General Communication Area |

Each of the buffers which comprise the 1k word ping-pong memory is described in detail below. The symbols shown in the table are simply suggested names to use for the start of each buffer to promote consistency between the 68k and TMS code. The buffers are organized such that the first two areas (TMSCOM and TMSIN) are ready-only for the TMS (write-only for the 68k). The next three areas are write-only for the TMS and vise versa for the 68k. Whereas the final area (TMSGC) is a read/write area for both processors.

The TMS command list is simply a NULL command terminated list of task requests for the TMS to perform in a given cycle. Up to seven (7) commands can be included in a list. Each element is a 16-bit command used to direct the actions of the TMS. The preferred commands are as follows:

| Command | Action |
|---|---|
| 1 | Not currently used |
| 2 | Not currently used |
| 3 | Not currently used |
| 4 | Not currently used |
| 5 | Not currently used |
| 6 | Calibrate initial position and velocity |
| 7 | Calculate torque (execute servo with no cycle update) |
| 8 | Calculate torque (execute servo with cycle update) |
| 9 | Not currently used |
| a | Identify TMS servo parameters and version ID |

The TMS input buffer contains additional input data required by the TMS conditioned on the value of the command word and its relative location in the command list. Input data required by each command is stored sequentially in the same order as the commands in the command list. Currently this buffer has the following format if the command word = 8 (e.g., a cycle or "long" tick); note that the organization of this table is by 16-bit "short" word count.

| TMSIN if absolute encoders and tachometers are used (e.g. 860/rx) | |
|---|---|
| Word | Contents |
| 0 | Time stamp |
| 1 | Servo enable mask |
| 2 | Velocity scale factor |
| 3 | High word of position command for joint 1 |
| 4 | Low word of position command for joint 1 |
| 5 | Absolute encoder measurement for joint 1 |
| 6 | Absolute velocity measurement for joint 1 |
| 7–10 | Words 3–6 for joint 2 |
| 11–14 | Words 3–6 for joint 3 |
| 15–18 | Words 3–6 for joint 4 |
| 19–22 | Words 3–6 for joint 5 |
| 23–26 | Words 3–6 for joint 6 |

| If the command word = 7 (e.g., a non-cycle or "short" tick) the TMS input buffer assumes the following form: | |
|---|---|
| Word | Contents |
| 0 | Time stamp |
| 1 | Servo enable mask |
| 2 | Absolute encoder measurement for joint 1 |
| 3 | Absolute velocity measurement for joint 1 |
| 4–5 | Words 2–3 for joint 2 |
| 6–7 | Words 2–3 for joint 3 |
| 8–9 | Words 2–3 for joint 4 |
| 10–11 | Words 2–3 for joint 5 |
| 12–13 | Words 2–3 for joint 6 |

| TMSIN for command = 8 if ONLY incremental encoders are used (e.g., Puma line) | |
|---|---|
| Word | Contents |
| 0 | Time stamp |
| 1 | Index interrupt/servo enable mask |
| 2 | Carry (wrap) for position feedback |
| 3 | Velocity scale factor (1608 format) |
| 4 | High word or position command for joint 1 (in 3208 form) |
| 5 | Low word of position command for joint 1 |
| 6 | Encoder count/index for joint 1 |
| 7–9 | Words 4–6 for joint 2 |
| 10–12 | Words 4–6 for joint 3 |
| 13–15 | Words 4–6 for joint 4 |
| 16–18 | Words 4–6 for joint 5 |
| 19–21 | Words 4–6 for joint 6 |

| If the command word = 7 (e.g., a non-cycle or "short" tick) the TMS input buffer assumes the following form when using incremental encoders: | |
|---|---|
| Word | Contents |
| 0 | Time stamp |
| 1 | Index interrupt/servo enable mask |

-continued

| | |
|---|---|
| 2 | Encoder count/index for joint 1 |
| 3 | Encoder count/index for joint 2 |
| 4 | Encoder count/index for joint 3 |
| 5 | Encoder count/index for joint 4 |
| 6 | Encoder count/index for joint 5 |
| 7 | Encoder count/index for joint 6 |

TMSIN for command = 8 if absolute resolvers are used (e.g., 100 robot)

| Word | Contents |
|---|---|
| 0 | Time stamp |
| 1 | Servo enable mask |
| 2 | Velocity scale factor |
| 3 | High word of position command for joint 1 |
| 4 | Low word of position command for joint 2 |
| 5 | Absolute resolver measurement for joint 1 |
| 6-8 | Words 3-5 for joint 2 |
| 9-11 | Words 3-5 for joint 3 |
| 12-14 | Words 3-5 for joint 4 |
| 15-17 | Words 3-5 for joint 5 |
| 18-20 | Words 3-5 for joint 6 |

If the command word = 7 (e.g., a non-cycle or "short" tick) the TMS input buffer assumes the following form:

| Word | Contents |
|---|---|
| 0 | Time stamp |
| 1 | Servo enable mask |
| 2 | Absolute resolver measurement for joint 1 |
| 3 | Absolute resolver measurement for joint 2 |
| 4 | Absolute resolver measurement for joint 3 |
| 5 | Absolute resolver measurement for joint 4 |
| 6 | Absolute resolver measurement for joint 5 |
| 7 | Absolute resolver measurement for joint 6 |

If the command word = 6 (e.g., a calibration command) the TMS input buffer is:

| Word | Contents |
|---|---|
| 0 | Time stamp |
| 1 | Absolute position in encoder bits (3208) for joint 1 |
| 2 | Absolute position in encoder bits (3208) for joint 2 |
| 3 | Absolute position in encoder bits (3208) for joint 3 |
| 4 | Absolute position in encoder bits (3208) for joint 4 |
| 5 | Absolute position in encoder bits (3208) for joint 5 |
| 6 | Absolute position in encoder bits (3208) for joint 6 |

If the command word = A (e.g., ID command), no inputs are required in the TMS input buffer.

The purpose of the TMS status buffer is to provide an area where any process can look to find out the current position/velocity of the arm. As such this buffer is ordered as follows:

| Word | Contents |
|---|---|
| 0 | Time stamp (future) |
| 1 | Enable/disable bit mask |
| 2 | Limp status bit mask |
| 3 | Brake status bit mask |
| 4 | PFB, Position of joint 1 in encoder bits in 3208 form (high word) |
| 5 | PFB, Position of joint 1 in encoder bits (low word) |
| 6 | VFINO, Velocity of joint 1 in encoder bits/ servo-tick in 1608 form |
| 7-9 | 4-6 for joint 2 |
| 10-12 | 4-6 for joint 3 |
| 13-15 | 4-6 for joint 4 |
| 16-18 | 4-6 for joint 5 |
| 19-21 | 4-6 for joint 6 |
| 22 | Status (error/no error/command error) |
| 23 | Servo coincidence word (fine/course) |
| 24-25 | Error status (hi and low) |

-continued

| Word | Contents |
|---|---|
| 26 | Input task bit mask (hi byte)/completion status bit mask (low byte) |

The torque output buffer contains the torques to be applied over the next servo tick. The torques are formatted such that the 68k can simply copy them directly to the appropriate device (DAC/TP board) without modification. This buffer is simply organized as:

| Word | Contents |
|---|---|
| 0 | Torque output for joint 1 |
| 1 | Torque output for joint 2 |
| 2 | Torque output for joint 3 |
| 3 | Torque output for joint 4 |
| 4 | Torque output for joint 5 |
| 5 | Torque output for joint 6 |

The logged data buffer currently is composed of the following items all recorded at the servo sample rate:

| Word | Contents |
|---|---|
| 0 | Joint 1 PCT, Position command in 3208 form (high word) |
| 1 | Joint 1 PCT, Position command (low word) (bits) |
| 2 | Joint 1 VCT, Velocity command in 1608 form (B/tick) |
| 3 | Joint 1 VFBF Filtered velocity feedback in 1608 form (B/tick) |
| 4 | Joint 1 Position error in 1605 form (bits) |
| 5 | Joint 1 Integration error 32016 form (high word) |
| 6 | Joint 1 Integration error (low word) |
| 7 | Joint 1 Velocity error in 1608 form (B/tick) |
| 8 | Joint 1 DVHATC Accel command in 1608 (B/tick/tick) |
| 9 | Joint 1 SUM, Intermediate signal sum in 1600 form |
| 10-18 | 0-8 for joint 2 |
| 19-27 | 0-8 for joint 3 |
| 28-36 | 0-8 for joint 4 |
| 37-45 | 0-8 for joint 5 |
| 46-54 | 0-8 for joint 6 |

The General Communication area is used as a general read/write area for passing information to and from the servo calculator.

Next, block 488 in FIG. 10A determines whether the torque processor board 600 of FIG. 6 is ready for data transfer and if not an error shutdown is commanded. Normally, however, the TP board 600 would be ready and block 489 transfers torque command and/or other data to the TP board 600. Other data may include servo gains and correct gains for the particular robot being controlled, all of which would be downloaded during set-up time. Blocks 490 and 491 then perform synchronous and one-shot data logging routines. The one-shot data logger 491 is flagged for operation by various routines when an error occurs.

SCM DATA LOGGER MECHANISMS

Both data loggers 490 and 491 shown in FIGS. 10G and 10H, respectively, are controlled by a shared RAM "mailbox" interface. In addition, both are invoked in the servo interrupt routine immediately following the execution of the servo code. Therefore, the fastest rate at which data can be logged is dictated by the servo update rate employed (currently this is 1 ms). In the case of the one-shot data logger, it can also be invoked via a subroutine call. This is provided so that conditions present during unexpected errors can be recorded immediately (for example, prior to an emergency shutdown).

The shared RAM interface for the synchronous data logger is organized as follows (where all addresses are specified as offsets from a base address):

| Offset | Size | Contents |
| --- | --- | --- |
| 0 | 8 bits | Semaphore (1 = > log data) |
| 1–3 | 24 bits | Not used |
| 4–5 | 16 bits | Starting tick counter |
| 6–7 | 16 bits | Not used |
| 8–9 | 16 bits | Ending tick counter |
| a–b | 32 bits | Not used |
| c–f | 32 bits | Pointer to list of addresses to log (32 bit data transfers) |
| 10–13 | 32 bits | Pointer to area in memory for SCM to deposit logged data |

Note: The areas which are not used in the above map will be eliminated in the future. They exist only because the original interface exclusively used long word quantities.

The shared RAM interface for the asynchronous one-shot data logger is organized as follows (where all addresses are specified as offsets from a base address):

| Offset | Size | Contents |
| --- | --- | --- |
| 0 | 8 bits | One-shot trigger (1 = log, reset to 0) |
| 1 | 8 bits | Not used |
| 2–3 | 16 bits | Total event counter |

In the servo calculator, two basic functions are performed. First, downloaded position command data is interpolated for each of the 31 ticks between long ticks in the VALCYCLE, and velocity and acceleration command data are computed from the position command data for each tick. Next, servo calculations are made for each axis after each tick for the position, velocity and acceleration commands then applicable and the concurrently received position and velocity feedback. As a result, a torque command is computed for each axis after every tick for execution by the torque processor board.

The control algorithm executed by the servo calculator is set forth in greater detail in Ser. No. 932,990.

BASIC ROBOT CONTROL—TORQUE PROCESSOR BOARD

TORQUE PROCESSOR BOARD CONCEPTS

The torque processor (TP) board 600 provides a functional interface to the robot joint drive motors. Functionally, the TP board 600 implements the lowest level of control in the hierarchical control system, providing closed loop servo torque control for six robot axes. Physically, the TP board 600 electrically interfaces the robot path planning control system and the servo control (SCM) board with the arm interface (AIF) board 800, which in turn interfaces to the robot joint drive motors. The primary function of the TP board 600 is to regulate the robot joint motor currents to commanded values by modulating motor winding voltages using a pulse width modulation scheme.

The TP board 600 interfaces at one level to the SCM board, accepts from the SCM board torque commands and servo parameters for six axes and returns status data. The TP board 600 interfaces at a second lower level to the AIF board 800 providing servo voltage commands for the six robot axes. The AIF board 800 receives drive motor current, position and velocity feedback for closed loop control on the SCM and TP boards.

The TP microprocessors used in the specific embodiment are the Motorola 68000 (16-bit microprocessor operating at 10.0 Mhz system clock frequency), and the TI TMS-320 Signal Processor.

The TP board 600 provides a number of features including the following:
1. Torque loop control for six axes (250 micro sec per 6 axes) for brush and brushless motors;
2. Software adjustable current offset—eliminates potentiometers;
3. Downloadable gains—arm dependent parameters can be downloaded from the SCM board;
4. PWM compensation;
5. Commutation compensation;
6. Current averaging for data logging and other purposes;
7. Current limit check;
8. Velocity monitoring (back emf) for safety check;
9. Energy check (IIT) to test stall condition;
10. Power-up self diagnostics; and
11. Downloadable diagnostics system.

TORQUE PROCESSOR BOARD

More advanced robot performance is produced by controlling the torque applied at the arm workpoint when the arm is in motion to control the arm workpoint position in accordance with a command trajectory. Thus, axis drive forces are adjusted in accordance with actually experienced workpiece loading to satisfy position and trajectory commands with greater speed, accuracy and efficiency.

The torque control is embodied on a generic control circuit board 600 (FIGS. 6 and 8A-1 and 8A-2) called a torque processor (TP) board i.e., an electronic board usable to provide torque control for a wide variety of robots having different load capacities, different types of drives, different numbers of axes, etc.

The torque processor board 600 employs digital circuitry to generate voltage commands for each joint motor or axis drive on the basis of torque commands obtained from a higher control level (SCM board) and feedback currents obtained through the arm interface (AIF) board 800 from the axis drives. Thus, the torque control loops for all of the joint motors are closed through the TP board circuitry.

In the case of electric drives, the feedback current is the motor winding current which is proportional to actual motor torque. For hydraulic drives, the feedback signal is also proportional to actual motor torque.

The digital torque control circuitry is preferably structured with multiple digital processors so that needed control computation and control support functions can be achieved for all axes accurately and efficiently within sampling frequency requirements.

In particular, a torque control manager 602 interfaces with a dual port SCM interface memory 604 for the exchange of stored torque control data between the SCM (servo control module) and the TP (torque processor) control levels. Axis torque commands and control loop parameters are downloaded from the SCM to the TP interface memory 604 through a data bus 606 preferably of the VME type. In return, status data is uploaded to the servo control level (SCM). The interface memory 604 between the TP and SCM boards is a dual port shared memory which serves as a slave to the VME bus 606. Other board memories include a ping-pong memory 608, program EPROM 614, local RAM 616, and TP calculator memory.

The torque control manager 602 also directs the flow of current feedback from circuitry on the AIF board 800 at the next lower control level to the torque processor board 600 for torque control loop operation. Drive voltage commands resulting from torque control calculations are directed to the arm interface (AIF) board 800 by the torque control manager 602. The ping-pong (bank switched) memory 608 operates under the control of handshake flags to store command, feedback, and status data so that it is available when needed for torque control calculations or for higher control level reporting requirements or for axis drive control.

A coprocessor 610 provided in the form of a digital signal processor operates as a torque loop calculator which receives torque commands and feedback currents from the torque control manager 602 through the ping-pong memory 608, calculates drive voltage commands for the various robot axes from the torque errors computed from the torque commands and feedback currents, and transfers the drive voltage commands through the ping-pong memory 608 to the arm interface circuitry on command from the torque control manager 602.

With the described digital circuit structure, all needed torque control functions are able to be performed rapidly (250 microsecond sampling rate or better) and accurately within frequency response requirements. Specifically, the rapid calculating capability of the digital signal processor 610 is employed for the torque control calculations as the data organizing and directing capability of the torque control manager 602 is employed for most other functions thereby enabling highly improved control performance to be achieved efficiently and economically.

The torque control manager 602 can, for example, be a Motorola 68000 which has an architecture well suited for the tasks described for data management but which has a calculating speed (i.e., over 4 microseconds for a 16×16 bit multiplication) too limited to meet torque control bandwidth requirements. The torque calculator 610 can for example be a Texas Instruments 320 digital signal processor which has an architecture set for Z transform calculations (i.e., a calculating speed of 200 nanoseconds for a 16×16 bit multiplication) but which is otherwise generally unsuitable for the kinds of tasks assigned to the torque control manager 602.

TORQUE CONTROL PROGRAMMING

The torque processor board 600 is operated under the control of programs executed in the on board processors 602 and 610 to implement torque command signals from the higher SCM control level.

The torque processor software generally performs the following tasks which are partitioned as indicated:

Torque Control Manager 602

Communication with SCM
Command handling
Current sampling, conversion and offset adjustment
Commutation switch flag (state reading)
Ping-pong memory management
PWM chip management
Diagnostics
Error reporting

Torque Loop Calculator 610

(program cycling based on 250 microsecond interrupt)

Overcurrent check—absolute and average
Torque loop calculations
Current averaging
PWM compensation
Commutation compensation
Back emf check—monitors velocity for safety Energy check—tests for stall conditions

TP MANAGER

More particularly, the torque control manager 602, as its name implies, directs most of the torque processor board operations. The torque loop calculator 610 affects board operations in the sense that calculated outputs enable certain board operations to occur under the direction of the torque control supervisor 602.

The programming for the torque control manager 602 includes various system housekeeping programs which support the operation of application programs involved in embodying the invention. The application programming is stored in an EPROM memory 614 referred to as the TCM (torque control manager) program memory. Operating data is stored in a local RAM memory 616 referred to as a TC (torque control) data base memory.

Figure 12A:
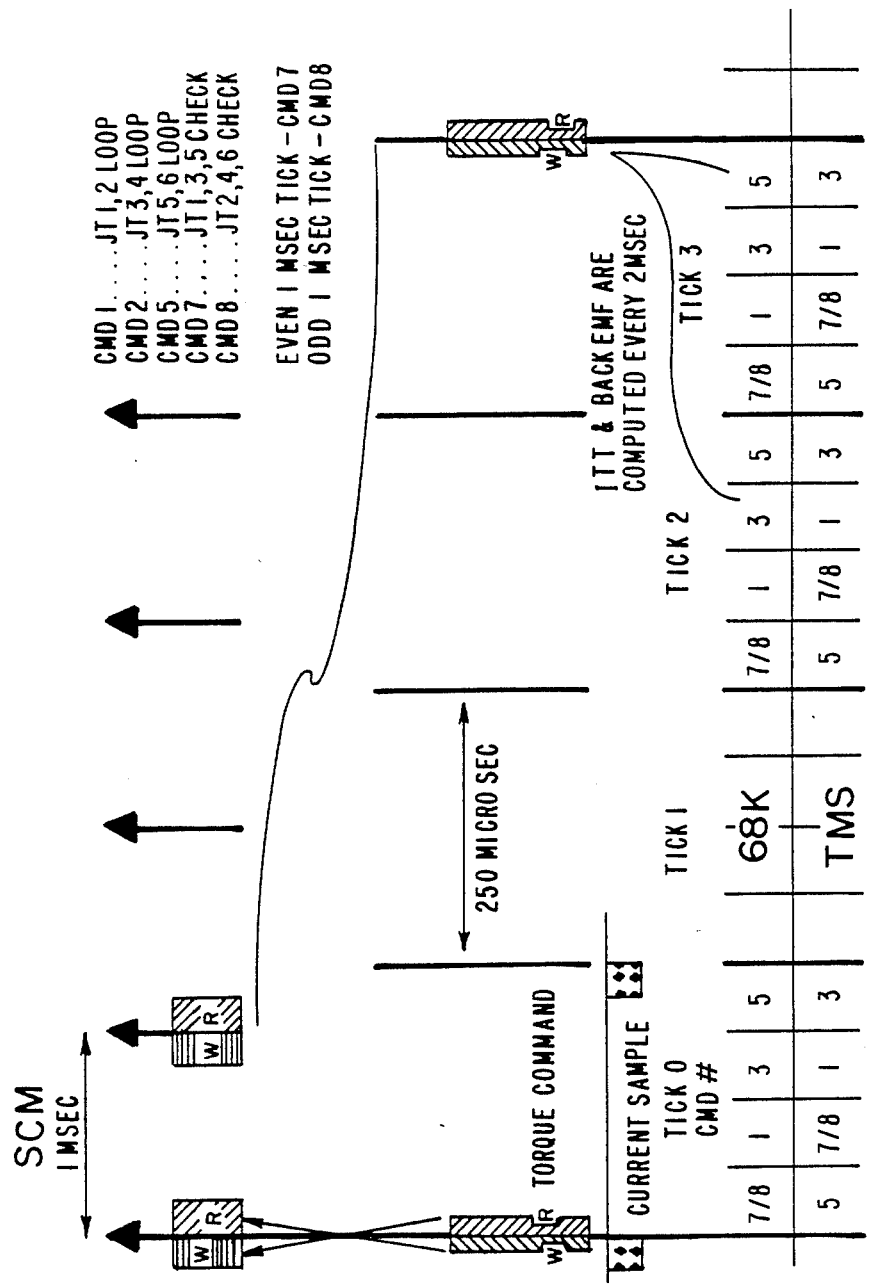
FIG. 12A shows an event timing chart for the TP board.
Figures 1, 12B:
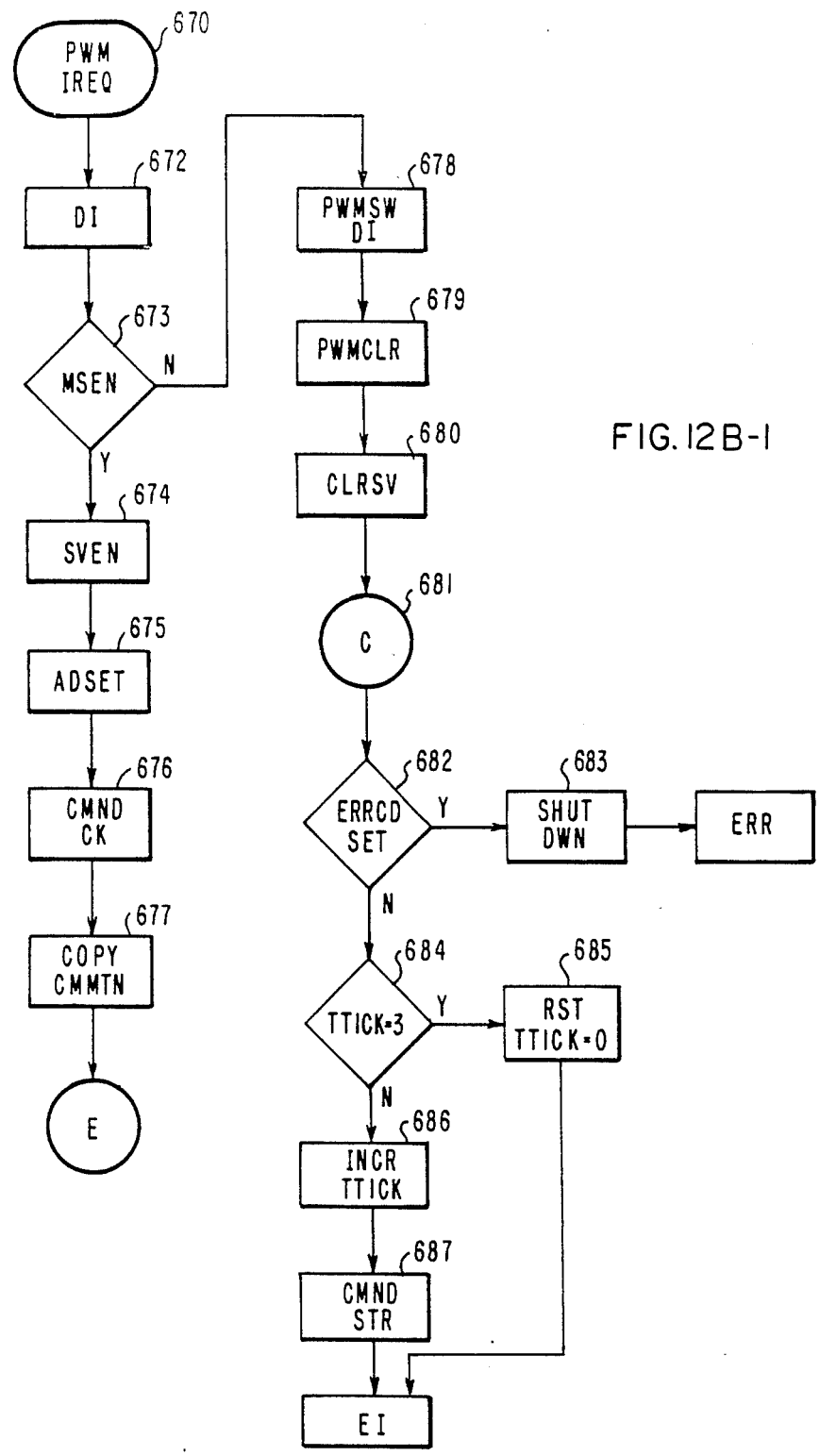
Figures 2, 12B:
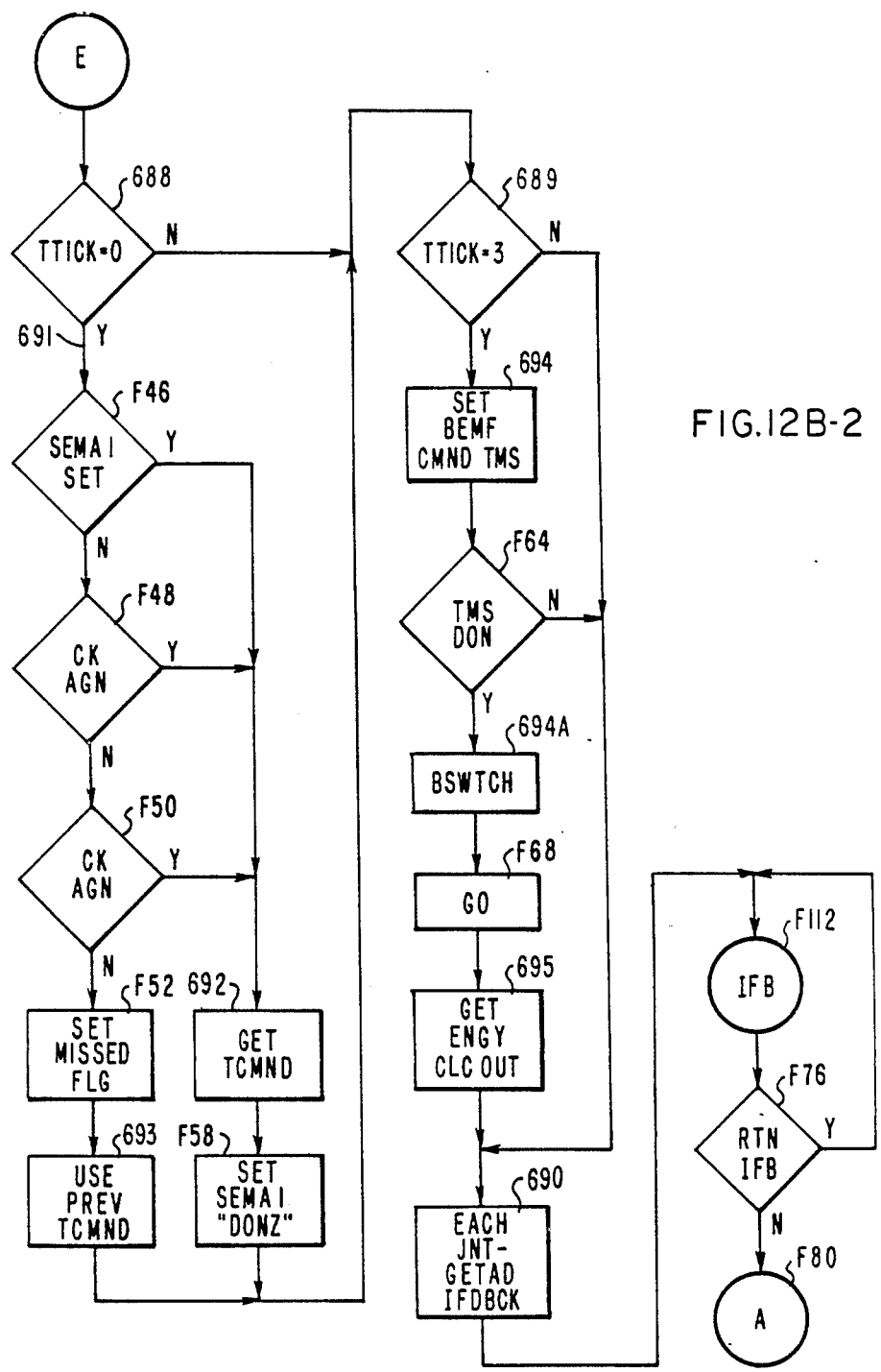
Figures 12C, 12D:
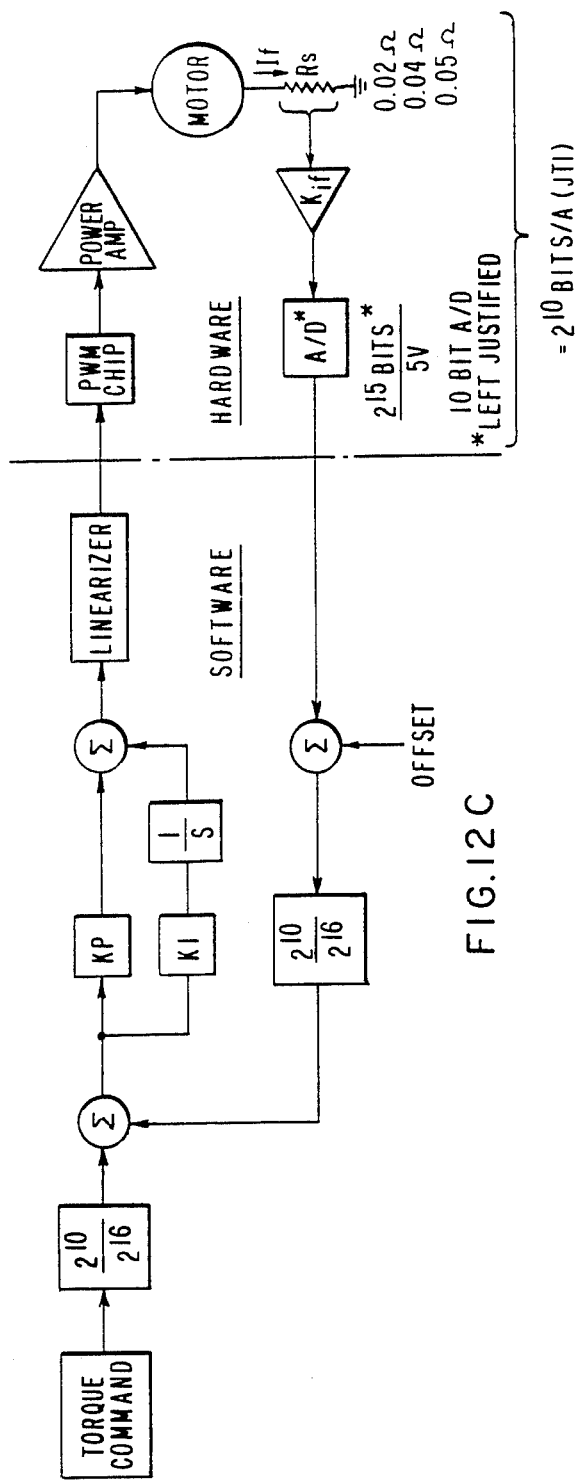
Figure 12E:
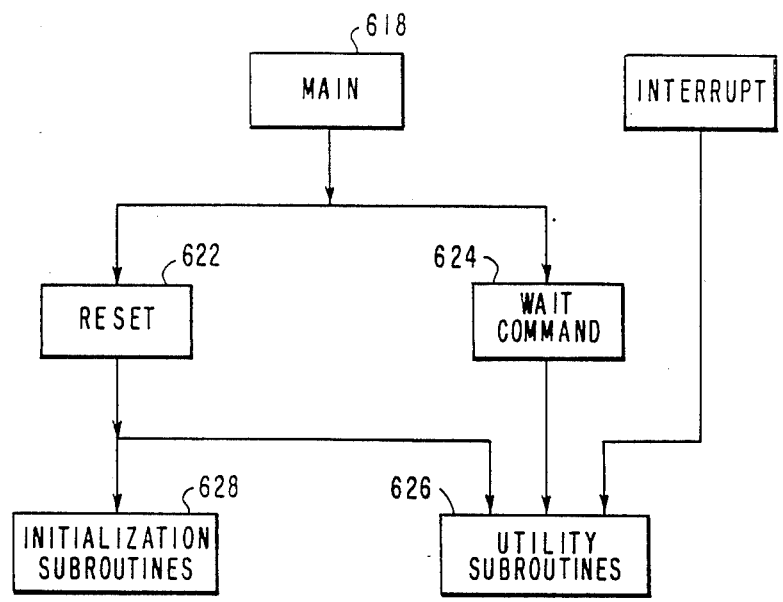

Referring in FIG. 12E torque control management programs include a main program 618 and an interrupt program 620. Generally, the main program 618 includes a reset subprogram 622 which provides the initialization service subroutines 628 needed at the arm interface and torque processor control levels for startup of TP board operation. The reset subprogram 622 additionally signals the higher SCM control level when the TP board 600 is ready for operating commands.

Thereafter, a wait command subprogram 624 administers the execution of diagnostic and other high priority nonmotion commands from the higher SCM control level. During motion control, torque commands are periodically generated, preferably each millisecond, and transferred under the control of the torque manager interrupt program 620 detailed in FIGS. 12H-1, 12H-2 and 12B-1, 12B-2 through the ping-pong memory 608 to the torque loop calculator 610 in FIG. 8A-1. The interrupt program 620 is operated cyclically by interrupt signals generated at the sampling rate (preferably every 250 microseconds) by an interrupt clock located in the lower level AIF board 800. The interrupt clock also provides the timing control for generation of the SCM torque commands every millisecond.

The interrupt program 620 in turn performs various administrative functions needed to support the operation of the torque loop calculator 610 as it performs torque calculations for each of the six axes of the robot arm during each interrupt cycle. Voltage commands resulting from torque loop calculations are routed from the ping-pong memory 608 for storage in the TC manager local RAM 616 and then through a data bus 607 and bus interface 156, preferably the VMX type, to the AIF board circuitry for conversion to pulse width modulated signals by the axis drives. Current and status feedback data is also transferred from the VMX bus 607 for storage in the TC manager local RAM memory 616 and subsequent routing through the ping-pong memory 608 for use in the torque calculator 610.

The bus 607 operates in the specific embodiment in accordance with VMX specifications for timing and signal pin number association. However, full VMX bus specifications associated with arbitration, multiple bus masters, and 24-bit address capability are not supported. Further, certain signals not specified in the VMX bus specifications are employed for control, interrupt, and error condition status information.

Various subroutines 626 are employed by the reset and wait command subprograms 622 and 624 and the interrupt program 620. The reset subprogram 622 also employs initialization subroutines 628.

As shown in FIG. 12I, the utility subroutines include the following with the functions indicated:

CHECKRAM—preselected memory diagnostics—check all RAM memories on board 600.
RAMTEST—apply bit tests to selected memory locations.
GETAD—enable transfer of analog input to memory.
AD-SET—set analog/digital converters in feedback channels.
COPYIN—copy specified parameters for 6 arm joints from torque control data SCM interface memory 604 to TC manager local RAM memory 616.
COPYOUT—copy specified parameters for 6 arm joints from TC data base memory 616 to torque control data SCM interface memory 604.
COPYTMS/S-COPYTMS—copy to/from TC data base memory 616 and ping-pong memory 608.
COPYCMD—copy command from TC data base memory 616 to ping-pong memory 608.
CLRSERVO—clear on-line torque loop calculation data in TC manger local RAM memory 616 and ping-pong memory 608.
PWMSW—on/off switch for PWM chip which is located in the arm interface control level and normally generates power amplifier commands for the arm drives.
PWMCLEAR—zero output command to PWM chip.
SVENABLE—specify maximum voltage command acceptable for execution.
SVDISABLE—hold PWM at zero output.
LOADTMS—download program to RAM memory 611 for the torque loop calculator 610.
ACTTMS—activate/deactivate torque loop calculator 610.
GIVPWM—apply voltage command to PWM chip.
COMMCHECK—receive position feedback data for all 6 drives and set respective flags if different from the next previous data.
COMMSTORE—store commutation state for all 6 joint motors.
GO—send GO signal to control register 630 (FIG. 8A) for torque loop calculator 610.
BSWITCH—switch command for ping-pong memory 608.
ERR—report error to higher SCM control level.
DI—disable execution of interrupt program 620.
EI—enable execution of interrupt program 620-schematic-interface buffers etc.; timing chart; TMS control algorithms; TMS flowchart; commutation switch function; incorporate Daggett TP write-up and related drawings; interface circuitry for SCM interface memory 604-general-details in Daggett write-up.

Figure 12F:
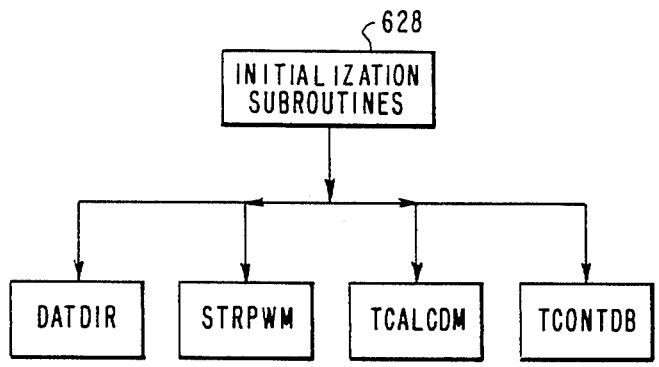

The initialization subroutines 628 employed in the reset subprogram are shown in FIG. 12F and include the following:

DATDIR—create in the TC data base memory 616 a data directory for the SCM interface memory 604.
STRPWM—store PWM I/O address in TC data base memory 616.
TCALCDB—clear and initialize the torque loop calculator data base in the internal RAM memory of the torque loop calculator 610.
TCONTDB—clear data base parameters in the TC manager local RAM memory 616.

PROGRAM FLOW CHARTS FOR TP BOARD MICROPROCESSORS

Figure 12G:
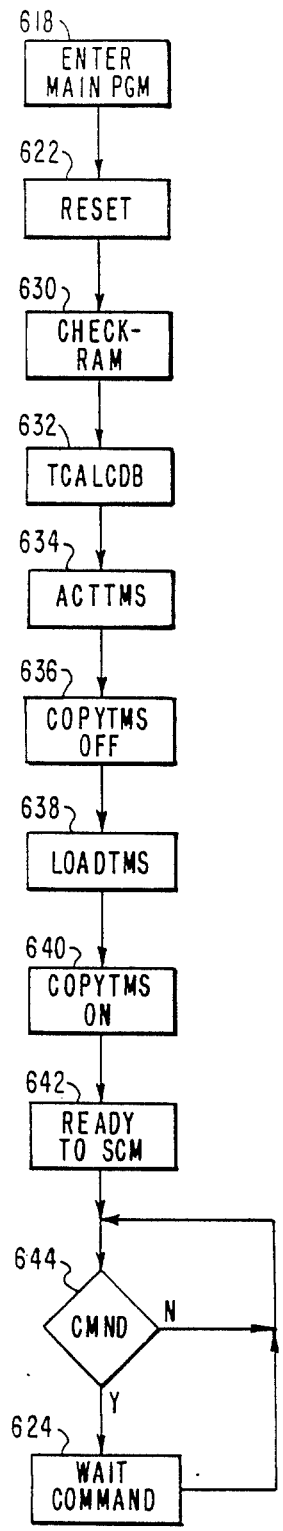

The main program 618 of FIG. 12E is illustrated in greater detail in FIG. 12G. Once the torque processor board 600 is started, the torque control manager 602 enters the main program 618 and executes the reset subprogram 622 to provide initialization service. As a result, the identification code for the torque control manager 602 is written onto the VME data but 606 in FIG. 8A-2 for communication to the higher control levels that may be packaged together in any particular robot application.

In addition, all semaphores are set to the same invalid state and the torque loop calculator 610 is cleared and reset. The local input/output hardware latch 607 operates as a selector for hardware or software control for the torque loop calculator 610 and a flag is set to enable control from the torque control manager 602 when the software control flag is set.

In its final phase of execution, the reset subprogram 622 of FIGS. 12E and 12G calls the utility subroutine PWMEN and a signal is thus generated for the next lower control level (arm interface level) to clear the arm drive circuitry and specifically to switch the controlling digital device referred to as the PWM chip to the OFF state.

The main program 618 in FIG. 12G continues the start-up procedure by calling the utility subroutine CHECKRAM in block 630 to provide memory diagnostics on all RAM memories on the TP card 600. Next, the initialization subroutine TCALCDB is called as indicated at 632 to clear/initialize the torque loop calculator data base in the TC data base memory 616.

The torque loop calculator 610 is then activated to the ON state by the subroutine ACTTMS as shown at 634. Next, the utility subroutine COPYTMS is called in block 626 to disable data copy to and from the TC data base memory 616 and the ping-pong memory 608. The utility subroutine LOADTMS is then called to download the TMS programming to the memory 611 as indicated at 638.

In block 640, the utility subroutine COPYTMS is again executed to enable copy to and from the TC manager local RAM memory 616 and the ping-pong memory 608. A signal is then generated by block 644 for the next higher SCM control level that the TP board 600 is now ready for robot control operation.

During subsequent active robot control operation, the main program 618 enters a wait command mode in which it undergoes continuous looping operating awaiting special high priority commands that may be generated by the higher SCM control level. Thus, block 644 determines whether a special command has been sent down to the TP board 600. Looping continues on the block 644 until a command is detected at which time the wait command subprogram 624 is called. After its execution, the command detection loop is re-entered until the next SCM command is received. In the block 644, SCM command detection is performed by looking at the appropriate message type semaphore to determine whether a flag has been set to signify that the higher SCM control level has downloaded a special command to the TP board 600.

Figures 1, 12H:
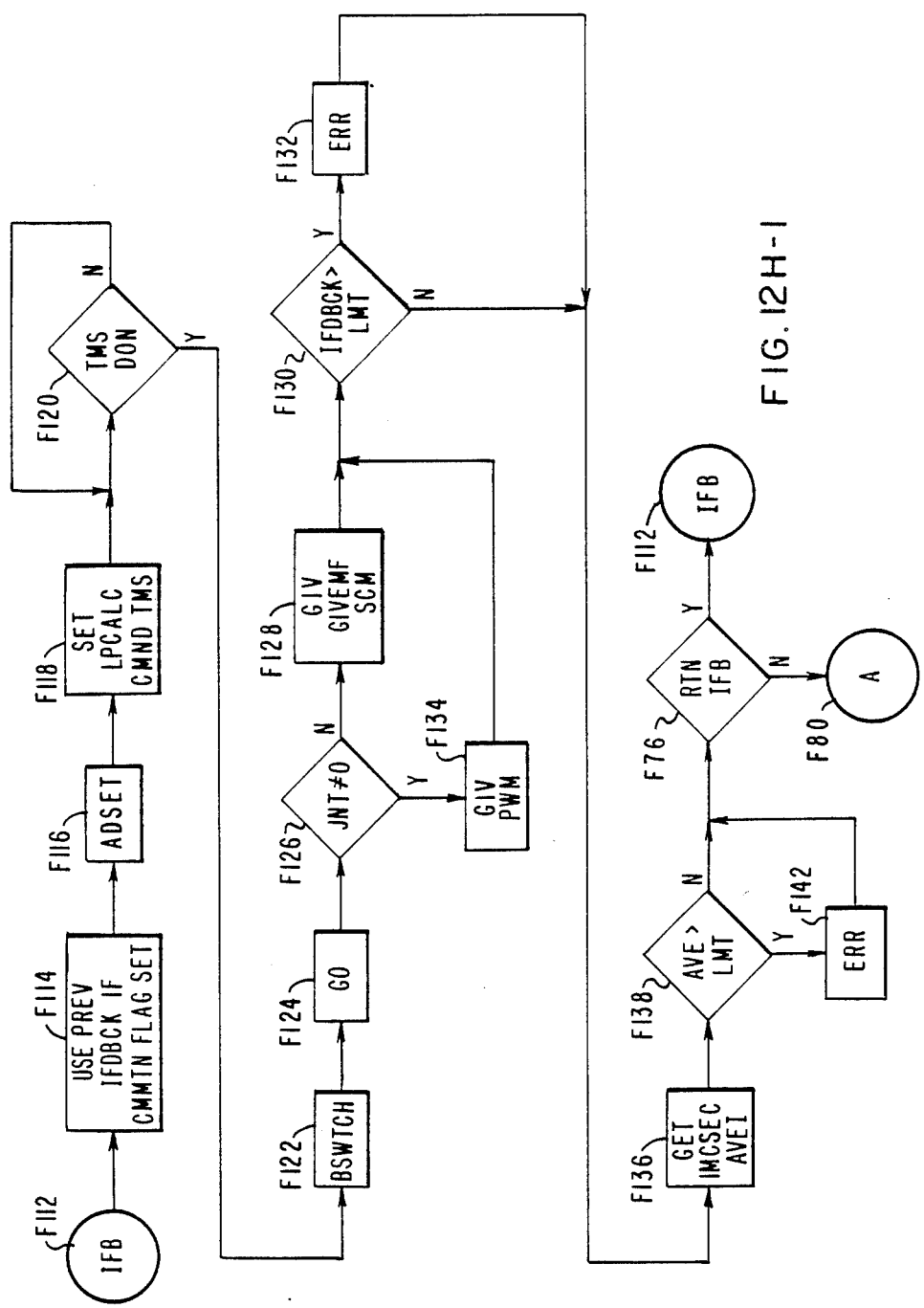
Figures 2, 12H:
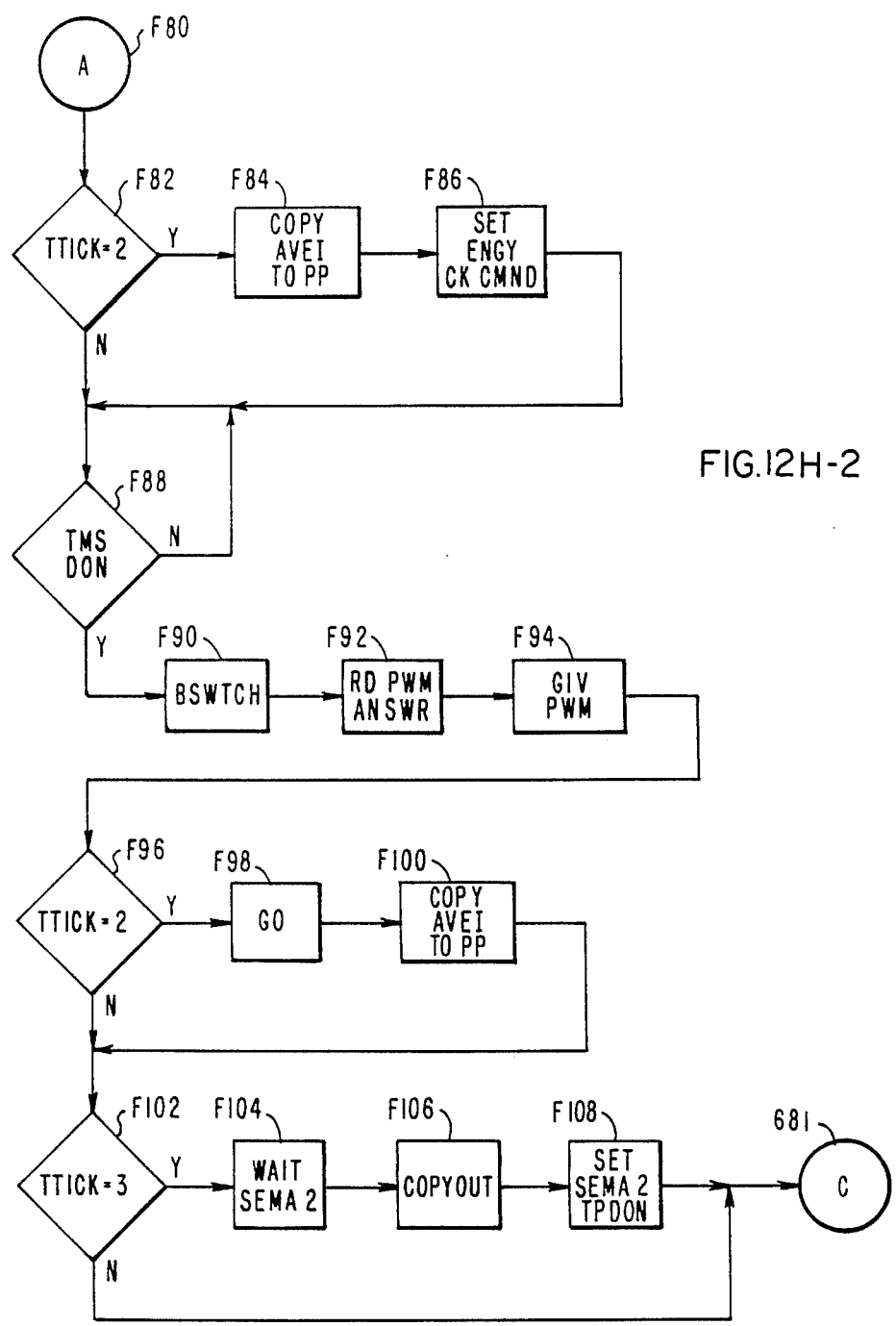
Figure 12:
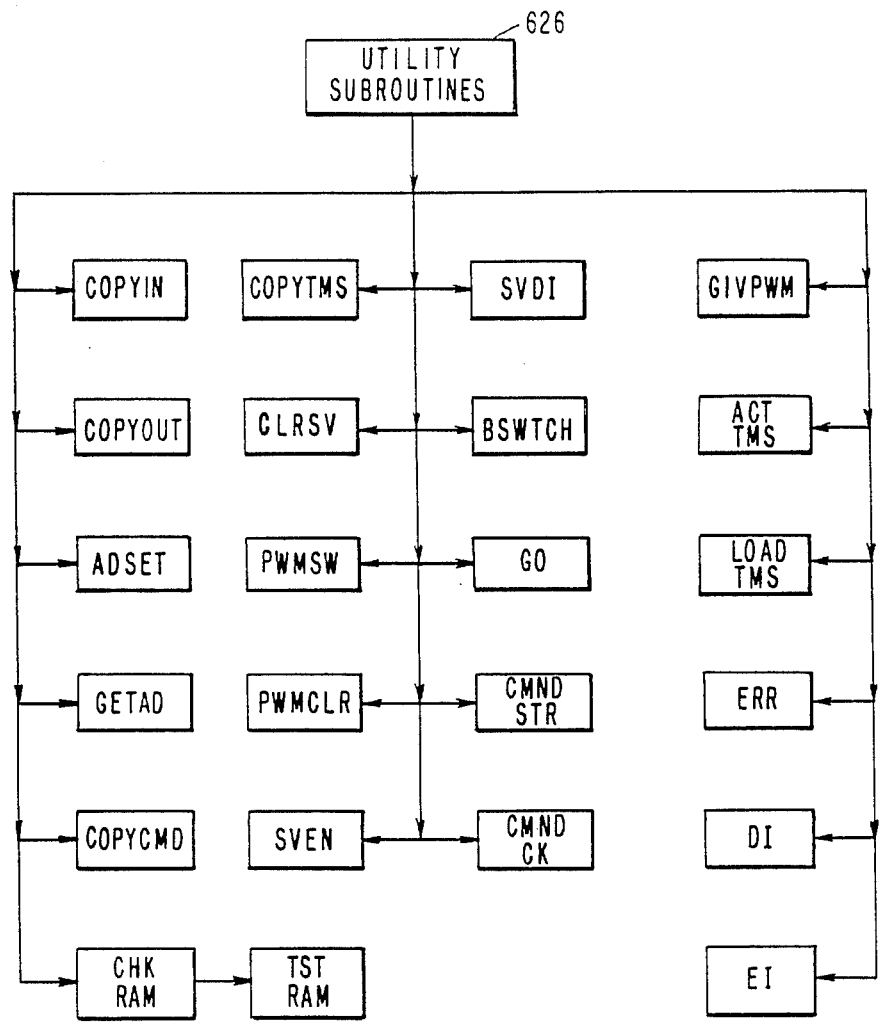
Figure 12J:
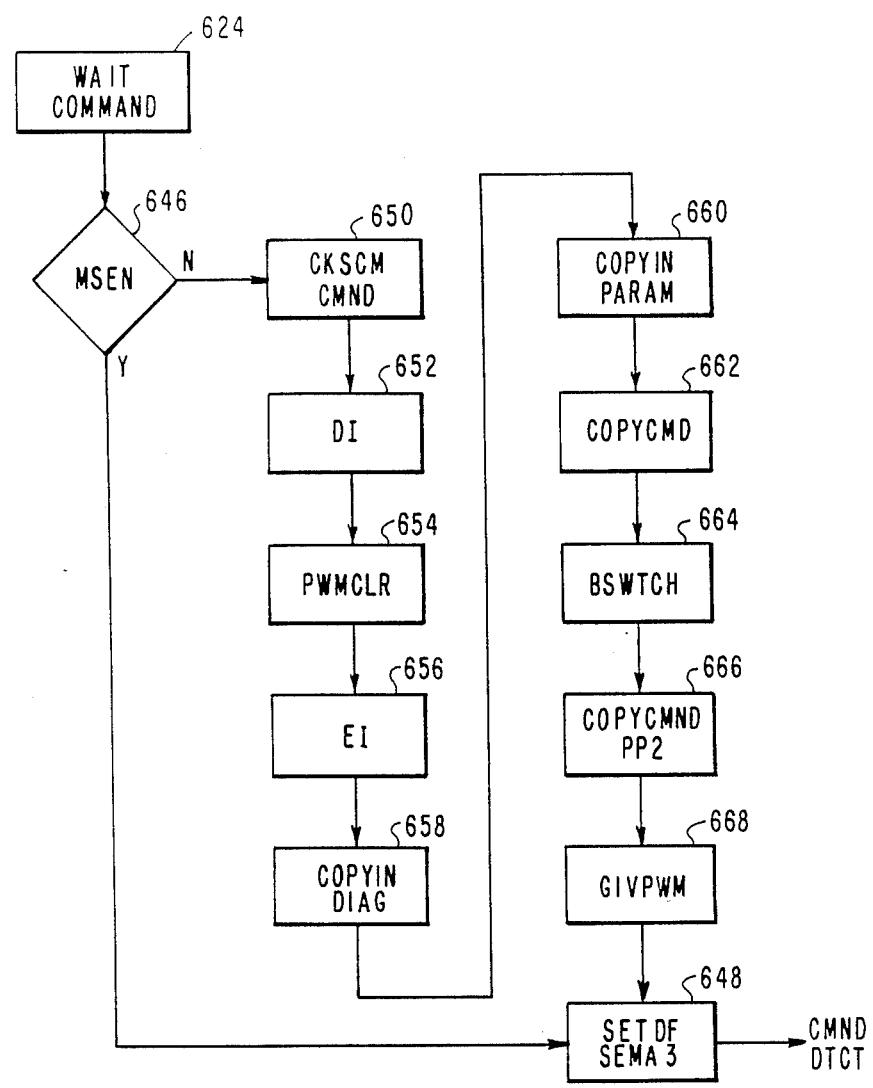

As shown in FIG. 12J, the wait command subprogram 624 first determines whether the system is ready for controlled robot arm motion, i.e., whether the higher SCM control level has just generated a master servo enable signal as indicated in block 646. In the master servo enabled mode, the SCM control generates a series of torque command signals for execution by the TP board 600. Preferably, the torque commands are generated once each millisecond as clocked from the AIF control level.

If a master servo enable signal has been generated to provide priority motion control, block 648 sets the appropriate semaphore flag down acknowledging to the higher SCM control level that the command has been received and that a response has been taken. The wait command subprogram then returns to the SCM command detection loop as robot arm motion control is implemented.

On the other hand, if the master servo is disabled, block 650 first checks an SCM command setup bit and block 652 next disables interrupt program execution since a command having higher priority than motion commands must be ascertained and implemented. Block 654 then calls the subroutine PWMCLEAR to set the output voltage command to zero. Next, the interrupt program is enabled to resume arm motion control on an interrupt control basis.

In blocks 658 and 660, a determination is made whether a diagnostic command or a parameter change command has been downloaded, and the SCM command is copied by the subroutine COPYIN in the TP manager RAM memory 616 for execution. Block 662 executes the utility subroutine COPYCMD to transfer the command to bank 1 of the ping-pong memory 608. Thereafter, BSWITCH is executed by block 664 to enable block 666 to transfer the SCM command to bank 2 of the ping-pong memory 608. In turn, the torque loop calculator 610 then executes the SCM command, and block 668 generates a signal for the SCM control level that the downloaded SCM command has been executed. The block 648 then sets the appropriate semaphore down flag and program execution continues as previously described.

The interrupt program 620 of FIG. 12E is shown in greater flow chart detail in FIG. 12B-1, B-2 and 12H-1, H-2. It is initiated as indicated at block 670 in FIG. 12B-1 once the interrupt clock signal from the AIF board 800 is enabled in the wait command subprogram 624 shown in FIG. 12E. Thereafter, it is executed at the control loop sampling rate, i.e., the interrupt rate of once every 250 microseconds.

Block 672 disables the interrupt and block 673 determines whether the master servo is enabled to permit robot control. If it is, the SV-ENABLE (SVEN), AD-SET, COMMCHECK (CMNDCK) and COMM-STORE (COPYCMMTN) utilities are executed in blocks 674–677.

If the master servo is not enabled, i.e., robot control is not permitted, PWMSW subroutine is executed in block 678 to disable PWM generation chips on the AIF board 800 and the utilities PWMCLR and CLRSV are executed in blocks 679 and 680.

Thereafter, an end interrupt branch 681 is entered and block 682 checks for shutdown errors block 683 executed robot shutdown if shutdown errors exists. If block 684 detects that the interrupt clock tick (generated every 250 microseconds) has reached a 3 count in the current millisecond common cycle time, block 685 resets the counter to 0 and the program ends. If not, block 686 increments the counter, block 687 stores the motor communication states and the program ends.

Figure 2:
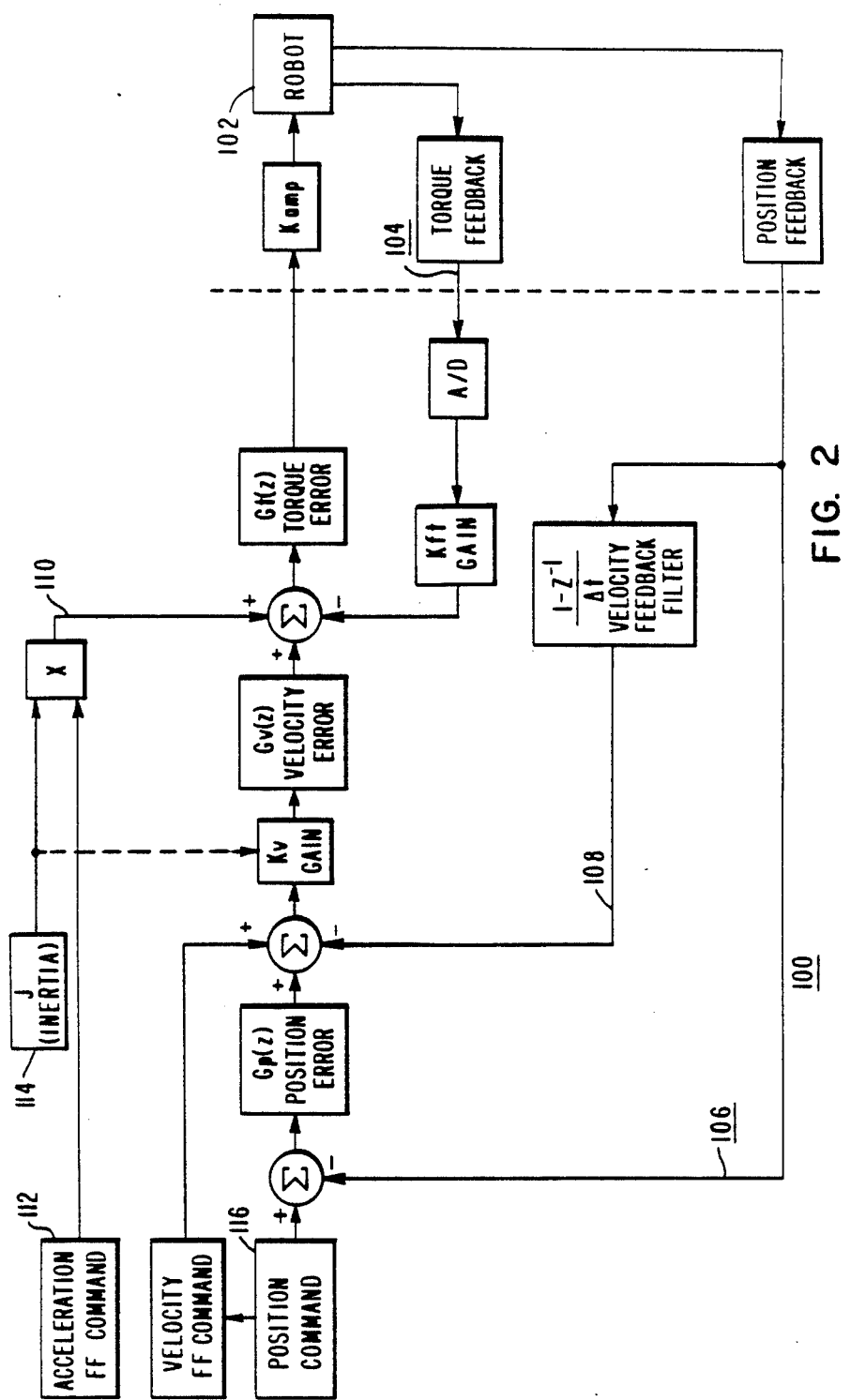
FIG. 2 shows a generalized block diagram of a control loop arrangement employing position, velocity and torque control loops in which the invention may be embodied.

With reference to FIG. 12B-2 for the case of an enabled master servo, blocks 688 and 689 check for a tick count of 0 and 3. If neither exists, block 690 next gets the current feedback for each robot axis. If the tick count is zero, branch 691 gets the new torque command (box 692) or, if missed, uses the previous torque command (box 693). At the tick count of 3, back emf command is set to TMS (box 694) and energy calculation output is obtained (box 695) and the ping-pong memory switch is set (box 694A).

The routine for fetching current feedback and performing other functions to be performed after each tick is designated as IFB, and it is looped in FIGS. 12H-1 until the six axes have been completed. As shown in FIG. 12H-1, the ping-pong memory switch F122 is set, PWM voltage commands are outputted by box F134 and BACKEMF is outputted by box F128. Limit checks are also made at F130 and F138. Thereafter, the program is branched to F80 via F76.

On return to main program branch F82 in FIG. 12H-2, box F84 copies average current to the ping-pong memory and box F86 sets the energy check command if the tick count is 2. Box F90 sets the ping-pong memory switch and box F94 outputs PWM voltage commands.

Figure 3:
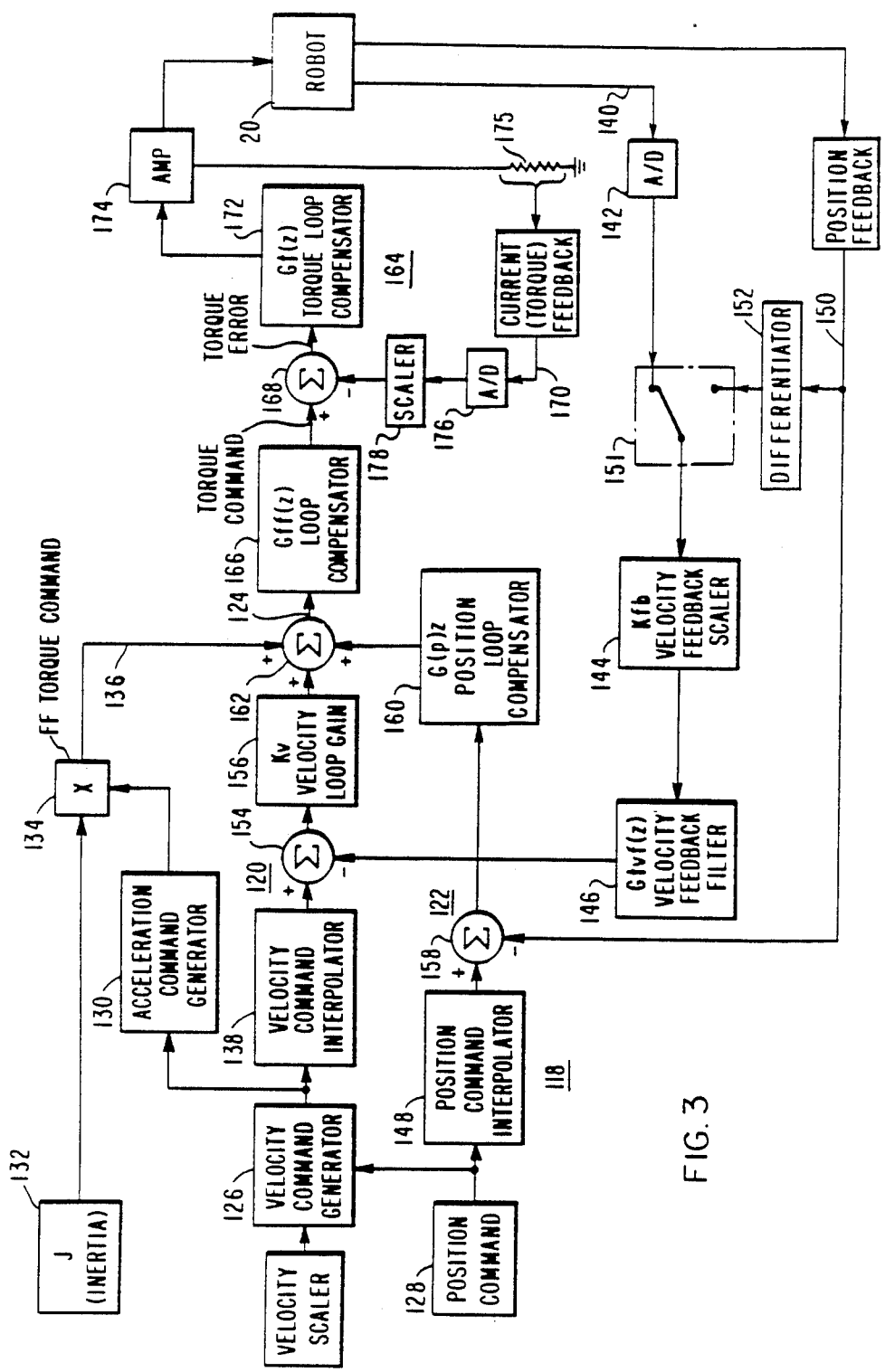
FIG. 3 shows a more detailed block diagram of a control loop arrangement employing position, velocity and torque control loops in which the invention preferably is embodied.

Block F96 in FIG. 12H-2 again checks the tick counter and if the count had not been but is now 2, block F100 copies average current to the ping-poing memory. Thereafter, flags are set and certain data is copied out in block F106 if the tick count is 3 in block F102. Finally, the end interrupt branch 681 in FIG. 10F-3 is entered to close out the execution of the interrupt program 620, using instructions shown at 682 to 687 in FIG. 12B-1.

TP CALCULATOR

Figure 12K:
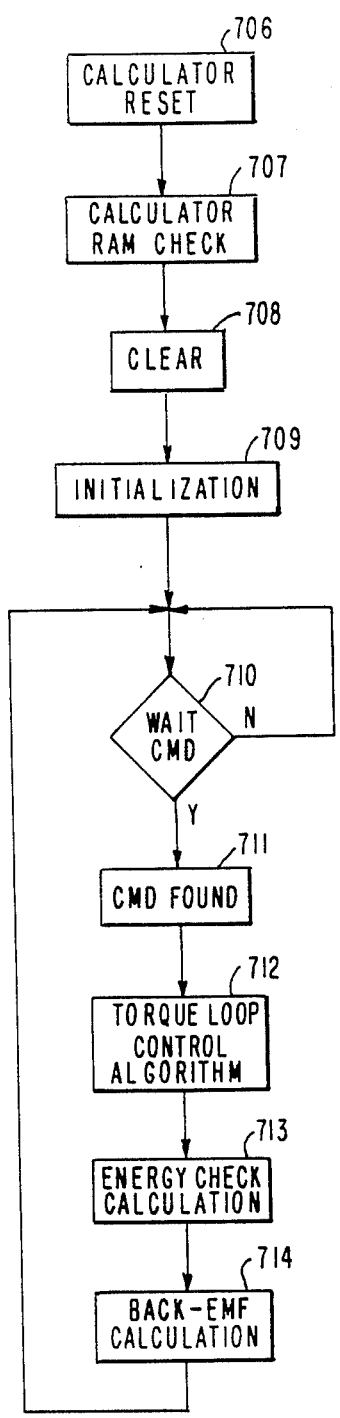

Programming for the TP calculator 610 is shown in FIG. 12K. A MAIN program 710 to 714 is executed cyclically at the sampling rate, and blocks 706, 707, 708 and 709, respectively, provide calculator (TMS) reset, and calculator (TMS) RAM check, clear and initialization. Block 710 thus waits for a torque command from the torque manager 602 of FIG. 8A-1.

When block 711 indicates availability of a torque command, the torque loop control algorithm is executed by box 712 for all six joint motors. Then, energy calculations are made in block 713 and back emfs are calculated in block 714 prior to ending the program execution.

CONTROL ALGORITHMS

In FIG. 2, there is shown a robot control loop arrangement for the specific embodiment. A more detailed diagram of the torque control loop portion of the overall robot control is shown in FIGS. 3 and 12C–D. The following control algorithms are executed in the torque 1009 calculator 610 in the implementation of the torque control loop portion of the overall robot control loop arrangement.

PI Control Algorithm

This algorithm is described in terms of a 250 micro second sample period.

(1) Input:
    torque command    Tc    from SCM (1 ms. update rate)
    feedback torque    T    from A/D converter
    (250 micro sec. update rate)
Tc, T are scaled as follows: 10 significant bits stored in 16-bit quantity left justified with a sign bits. This format is selected to simplify the A/D interfacing.
    SDDD DDDD DDXX XXXX
Output:
    PWM command    PWMout    to PWM command register
    (250 micro sec. update rate)

(2) Principle:
$$PWMin = Kp \frac{(s + 1/tau)}{s} * Terr$$

Terr = Tc − T
Kp: torque loop proportional gain
tau: time constant of integral (mechanical time constant of motor)

(3) Algorithm
```
/* get error */
T(n) = (input data from A/D)
/* normalize the size */
Terr = *2**10 − T(n)*2**10)/2**16
/* compute next integral */
temp(n) = integ + KI * Terr
/* check the integration limit */
if (temp <= − intlmt) then temp = −intlmt
if (intlmt <= temp) then temp = intlmt
/* store the integral value for next time */
integ = temp
/* get PI result */
temp = integ/2**16 + KP * Terr
/* check the overflow */
if (temp > 78FF) then temp = 78FF
if (temp > 8680) then temp = 8680
/* now linearize the PWM* */
if (temp >= 200) then PWMout = temp + 700
if (200> temp >=0) then PWMout = temp *2 + 500
if (0> temp >= FDCO) then PWMout = temp *2 + FB80
if (FDCO > temp) then PWMout = temp + F980
KI = (KP/tau)*Ts
Ts = sample period = 250 micro sec.
```

(4) Scaling of KP and KI
  (i) dimensions kp: [V/N-M]
    tau,TS: [sec]

| Torque<br>N-M | Current<br>A | Terr*2**6<br>bits | PWMout<br>bits | Motor<br>Volt<br>Volt |
|---|---|---|---|---|
| >-----Kt----|-Kad--- |-KP*2**-16------|-----Kpwm------|-59 > |
| <=========Kp===========> | | | | |

Kt    torque − current gain    [A/N-M]
Kad    A/D converter gain    [bit/A]
KpwmPWM gain    [V/bit]
  (ii) equation
    Kt*(Kad)*KP*(2**(10-16))*Kpwm = Kp
    Kp = Kp*(2*6)/(Kt*Kad*Kpwm)
    KI = Kp*Ts/tau Note:
1. If A/D converter full scale is +/− Imax then Kad = 2**15/Imax [bit/A]
2. If PWM chip and power block gain is +/− Vmax then Kpwm = Vmax/2**15 [V/bit], therefore, Kad*Kpwm = Vmax/Imax [V/A]

Back-emf Algorithm

The back-emf EMF calculation is used to provide an estimate of motor speed for safety purposes.

(1) Input:
    motor current    i    from A/D converter
    motor voltage    Vin    from PWM command register Output:
    Back-emf    VEL estimated velocity (2) Principle:
    VEL = w*Ke = Vin − (L*di/dt + iR)

| | | |
|---|---|---|
| R | = motor resistant | [ohm] |
| L | = motor inductance | [H] |
| Vin | = motor terminal voltage | [V] |
| Ke | = motor Back-emf constant | [V/rad/sec] |
| w | = motor velocity | [rad/sec] |
| i | = motor current | [A] |

(3) Algorithm:
VEL(n) = [PWMout*2**9 − MOTL* i(n) − i(n) − 1) − i(n)*MOTR]/2**16
where:
    i(n) is A/D value shifted right 6 bits and accumulated 1 mesc/Ts times (running 1 msec average).
    Ts is PWM sample rate = 250 micro sec (4) Scaling of L, R:
  (i) equations:
    MOTR = 2**13 * Imax/Vmax * R(ohm)
    MOTL = 2**13 * Imax/Vmax * 1/delt * L(H)
    SV = 2**-8 * Vmax
    where Krpm = (SV/KE) * VEL
  (ii) example:
    Vmax = 300V, Imax = 20A, R = 0.49 ohm, L = 5.5 mh
    KE = 120V/Krpm, delt = 4 msec
    MOTR = 268, MOTL − 751
    Krpm = 9.76 * 10**-3 * VEL

| Vin<br>V | PWMout<br>bits | VEL<br>bits | VELemf<br>bits |
|---|---|---|---|
| -----Kpwm------ | -2**-9- --+ | -----2**-16*SV---- | -1/KE-- |

Iin
A
--Kad- -2*2- -6)- -MOTR-    Kpwm = Vmax/215
                      --MOTL-    Kad = 2**15/Imax

Energy Check Algorithm

The energy check calculates motor energy and alarms the SCF when energy exceeds a specified limit for a specified period of time.

(1) Input:
    current    CUR1    1 msec averaged current
    energy limit    ELIMIT    from SCM Board (constant)
    time constant    TAU    from SCM Board (constant)
Output:
    alarm    ECODE    to SCM Board (2) Principle:
    i*i            Energy
    i-----x-----1/1(1 + as)------Threshold-----Alarm
    | |       1st order filter
    |--|
    i = current [A]

(3) Algorithm:
    temp = CUR1**2 − ENERGY
    ZOENGY = ZOENGY + temp
    ENERGY = ZOENGY/2**16 * TAU
    if |ENERGY| > ELIMIT
        then ECODE = OVENGY (4) Scaling:
  (i) condition of alarm output
    if step input of i**2 = k*limit is applied, then output and alarm condition tx seconds after step is applied.
  (ii) equation
    a    = delt * 2**16/tau
    tau    = delt * 2**16/a
         = about 20 to 40 for delt = 4 msec

TP CYCLING OPERATION

The cyclic operation of the TP circuitry is shown in FIG. 12A to clarify the manner in which the various control events are interrelated. As shown by the upper scale, the SCM board 400 operates on a 1 millisecond cycle. The TP board 600 operates on a ¼ millisecond sampling cycle as shown by the lower scale. The four TP board sampling intervals are marked by ticks 0 through 3.

The latest torque commands are received by the torque manager 600 in the order shown in each sampling interval for the six joints on the 68K scale. With a 62.5 microsecond delay, the torque commands are transferred to the TP calculator in the same order. Current feedbacks are received at the beginning of each sampling interval for all joints and transferred to the TP calculator.

BASIC ROBOT CONTROL—ARM INTERFACE BOARD

ARM INTERFACE CIRCUITRY

Figure 9:
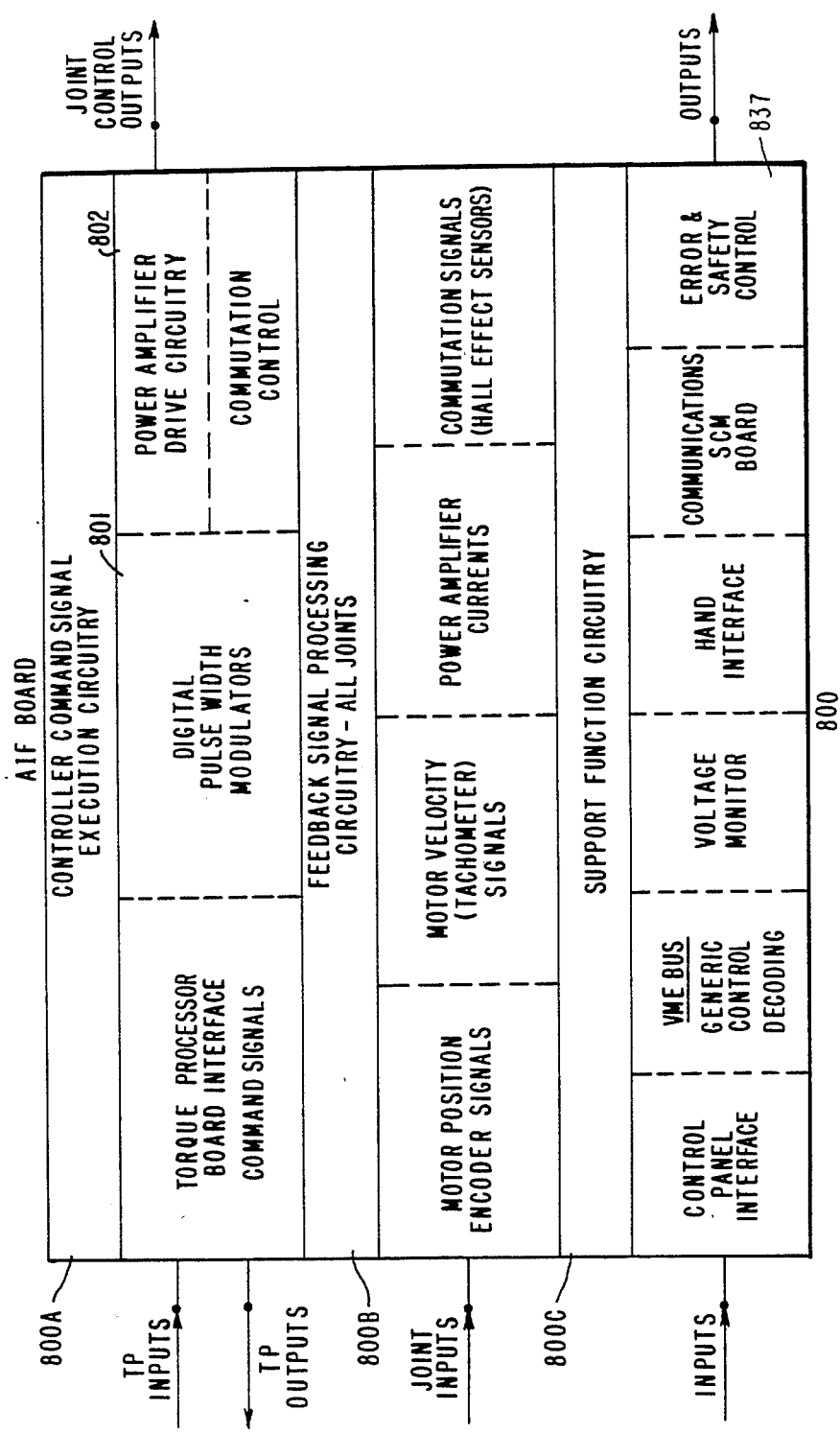
FIG. 9 shows a block diagram of an arm interface board employed in the robot control.

The arm interface circuitry disposed on the arm interface board 800 of FIG. 6 and functionally interrelated in FIG. 9, operates primarily to:

1. Process control command signals to develop drive signals for power amplifiers which operate the axis motor as indicated by box 800A;
2. Process current, position, velocity and communication feedback signals as indicated by box 800B for use in the higher level control loops and the drive circuitry;
3. Perform various support functions as indicated by box 800C including control of VME bus operations, network communications interfacing, supply voltage monitoring, control panel interfacing, robot hand interfacing, and error and safety monitoring and control.

The digital robot control system is universally applicable to various kinds and sizes of robot arms because:

1. The overall control circuitry is generally structured to provide the basic control functions needed for universal application to robot arms;
2. The arm dependent board circuitry is disposed on the arm interface board—thereby enabling all higher level circuit boards to be packaged in a robot control system independently of the characteristics of the particular robot arm to be controlled;
3. The arm interface circuitry on the board 800 is organized so that a limited number of different arm interface boards can accommodate the requirements of a wide variety of robot arms including hydraulic robot arms, electric robot arms (brush type or brushless motors), large high power robot arms, small low power robot arms, robot arms produces by different manufacturers, etc.
4. Communications capability is included to enable application to robot arms in work cells, robot networks, and automated factories.

Thus, the robot control circuitry is structured to provide low cost control system manufacture and improved robot arm control and performance while simultaneously enabling ready modification of the robot control system for universal application to varied types of robot arms. In addition, as a result of its modularity, the control system can be readily packaged to provide different levels of control capacity and performance according to user needs.

The AIF board 800 (FIG. 9) is provided with brushless DC motor control circuitry and absolute position and tachometer feedback circuitry to adapt it for controlling the Unimation 860 robot.

ARM DRIVE CONTROL—BRUSHLESS DC MOTORS

As previously described, the higher level control looping generates current command signals for the robot arm axes to that the arm workpoint (effector) is moved to commanded positions under controlled velocity, acceleration and torque in accordance with a user's robot program. Pulse width modulation circuitry 801 and drive circuitry 802 are provided on the arm interface board 800 to develop axis motor drive signals, in this instance for application to power amplifiers which provide the drive currents to brushless D.C. electric motors respectively associated with the six axes of arm motion.

Separate drive circuit channels are provided on the AIF board 800 to process and couple the PWM digital outputs to the power amplifiers for the respective brushless DC robot joint motors.

In the motor winding and power switch circuitry for each brushless joint motor, the switches are operated in bi-directional pairs in order to direct current through two of the three windings at any one point in time, and the winding connection switching is rotated about the windings under PAL device control. The effective magnitude of the motor current depends on the switch ON time which in turn is controlled by the PWM output.

Figure 13A:
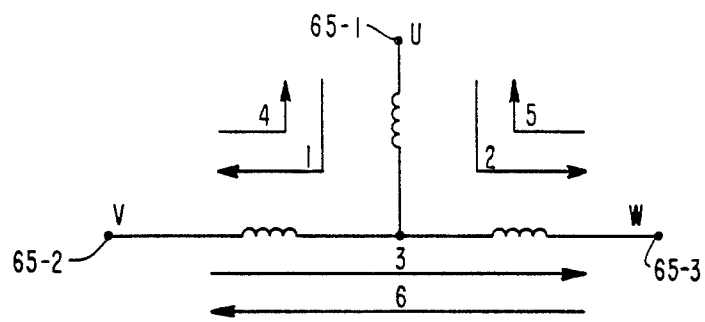
FIGS. 13A, 13B and 13C show respective bridge configurations for brushless and brush type DC joint motors.

In FIG. 13A, there is shown the stator winding circuitry for DC brushless motors employed as axis drives in various robots including the Unimation 860 robot which is more powerful than the Unimation 700 Series robot shown in FIG. 1.

Figure 13B:
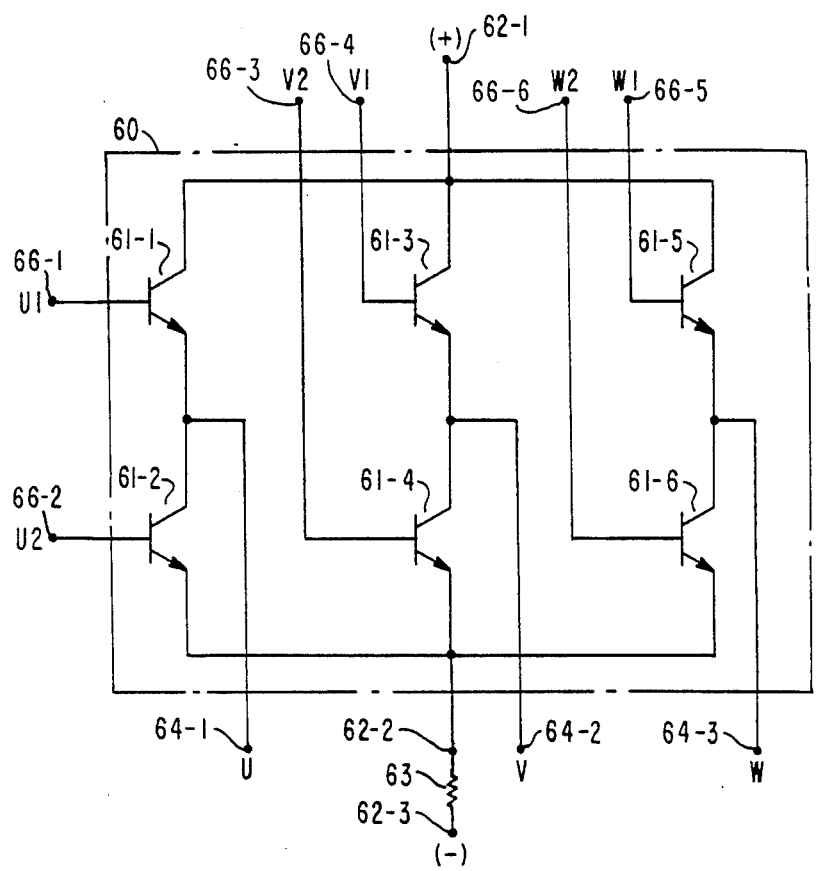

Power switch circuitry for the windings is shown in FIG. 13B. The switches are operated to direct current through two of the three windings at any one point in time, and the winding connection switching is rotated about the windings under PAL device control. The effective magnitude of the motor current depends on the switch ON time which in turn is controlled by the PWM output.

A commercially available, low cost hybrid power amplifier block 60 (FIG. 13B) is provided for energizing the DC brushless motor windings. As indicated by the dotted box, the power amplifier block 60 is packaged to include the six semiconductor switches 61-1 through 61-6 needed for operating the three phase windings of the brushless DC motor. The block 60 is a low cost power amplifier mainly because the device is packaged to contain a simple switching circuit configuration without internal control loops.

The power amplifier block 60 is provided with external power supply terminals 62-1 and 62-2. A current sense resistor 63 is connected to the terminal 62-2 for series connection to the power supply so as to provide motor current feedback signals for control loop operation as more fully disclosed in the incorporated-by-reference patent application Ser. No. 932,975.

The power amplifier block 60 additionally includes external terminals 64-1, 64-2 and 64-3 for respective connection to the free ends 65-1, 65-2 and 65-3 of the Y connected motor windings in FIG. 13A. External terminals 66-1 through 66-5 are also provided for application of the switch control signals U1 and U2, V1 and V2 and W1 and W2 from the PWM commutation circuitry. To prevent power supply shorting and switch burnout, the power switches are always controlled so that only one switch can be on at a time in each of the respective pairs of switches 61-1 and 1, 61-3 and 4 and 61-5 and 6.

The control signals U1, V1 and W1 are the basic pulse width control signals that control the level of drive current through the motor windings. The control signals U2, V2 and W2 enable the six motor windings conduction paths in rotation and generally provide for the flow of freewheeling motor currents. Reference is made to W.E. 53,637 for a more complete description of the brushless motor embodiment.

H BRIDGE POWER AMPLIFIER—DC BRUSH TYPE MOTORS

Figure 13C:
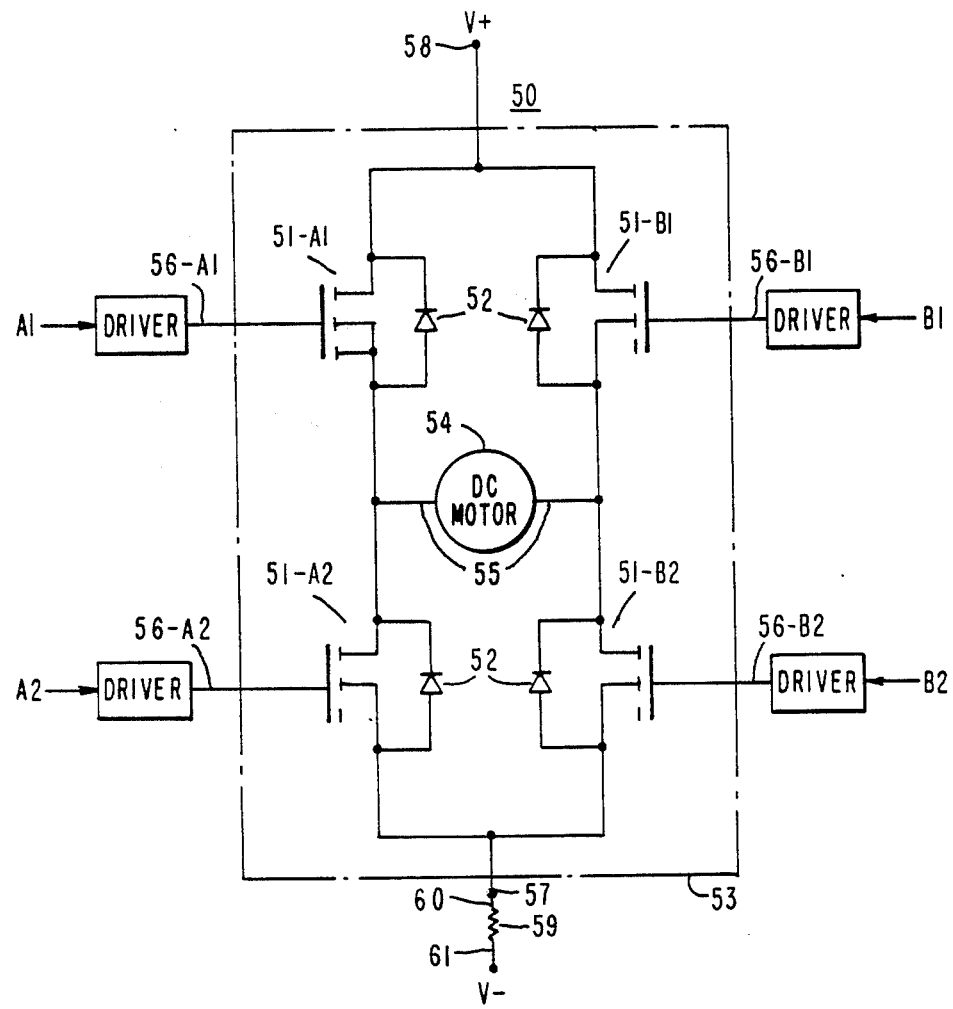

An H bridge power amplifier or block 50 of the low cost hybrid type is shown in FIG. 13C, and one of the power blocks 50 is employed to provide motor drive current for each robot arm joint motor in DC brush type motors.

The power block 50 includes four semiconductor switches 51-A1, 51-A2, 51-B1 and 51-B2. Respective protective back voltage diodes 52 are connected across the respective semiconductor switches to permit the flow of freewheeling currents when the switches 51-A1 and 51-B are turned off.

The switches and diodes are packaged within a block indicated by dotted line 53. As previously indicated, no internal control circuitry is included in the hybrid type power block thereby enabling flexible configuration of external controls.

A robot joint DC brush type motor 54 (representative of any of the joint motors included in the Unimation 700 series robot arm of FIG. 1) is connected in a cross-path 55 of the H bridge circuit. When switches 51-A1 and 51-B2 are turned on, a positive voltage is applied across the motor 54 and current flows to the right in the crosspath 55 to drive the motor in the forward direction. With switches 51-B1 and 51-A2 turned on, current flows through the crosspath 55 in the opposite direction to drive the motor in the reverse direction. The digital pulses A1 and B1 precisely control the on time of the switches 51-B1 and 56-B1 respectively so as to produce the motor current needed to satisfy control commands. The pulses A2 and B2 control the on time of the switches 51-A2 and 51-B2 so that the B2 and A2 on times respectively embrace the A1 and B1 on times (thereby providing closed paths for motor drive current during A1, B1 on time and circulating paths for motor freewheeling currents during A1, B1 off times) and so that the A1 and A2 switches are not on at the same time and the B1 and B2 switches are not on at the same time (to avoid shorting the power supply).

The digital pulse pairs A1, B2 and B1, A2 determine the switch on time for forward motor drive current and reverse motor drive current respectively. In turn, the switch on time determines the motor energization level, i.e., the motor torque.

Switch base leads 56A1, A2, B1, B2 extend from the switches to the outside of the block 53 where switch drive signals A1, A2, B1 and B2 are coupled from the pulse width modulator. Power supply voltage V is connected across external supply leads 57 and 58 to provide the motor drive current. An external current sensing resistor 59 is connected in series between the lead 57 and the power supply. Conductors 60 and 61 are connected from the two resistor terminals to apply the voltage drop across the current sensing resistor to the current feedback circuitry on the AIF board where it is processed for use in the current or torque control loop.

What is claimed is:

1. A modular digital control for a robot having an arm with each of a plurality of joints driven by an electric motor in turn supplied with drive current by a power amplifier, said modular robot control comprising:

an arm interface module having circuitry for performing robot arm dependent functions including circuit means for generating power amplifier control signals in response to input voltage command signals;

said arm interface module circuitry further including circuit means for processing and manipulating position, velocity and motor current feedback signals;

a torque processor module having torque microprocessor servo means for operating each of respective torque control loops for the respective joint motors;

said torque microprocessor servo means generating said input voltage command signals in response to input torque commands and feedback motor current signals;

a servo control module having position/velocity microprocessor servo means having digital signal processing capability for operating position and velocity control loops for the respective joint motors;

said position/velocity microprocessor servo means generating said input torque commands in response to input position commands and said position and velocity feedback signals;

said servo control module further including system resource means providing a hierarchical general support for the operation of said servo means and including data communicating control means for communications interfacing with local input/output devices and other systems and devices;

program storage means for storing program means operative when executed to provide trajectory planning and interpolation and generate said input position commands in accordance with predefined moves set forth in a robot program;

means for coupling said program storage means to said position/velocity microprocessor servo means to enable execution of said program means therein; and means for interconnecting said servo control, torque processor and arm interface modules to provide a complete basic control for said robot joint motors.

2. A modular robot control as set forth in claim 1 wherein said program storage means includes memory means included in said system resource means.

3. A modular robot control as set forth in claim 2 wherein there is provided at least one system level module having system microprocessor means operative to execute said program means; and means for interconnecting said system level module with said position/velocity microprocessor servo module so as to couple said system resource means thereto and so as to enable said up position commands to be applied to said position/velocity microprocessor servo means.

4. A modular robot control as set forth in claim 3 wherein said arm interface module is embodied on a first electronc board;

said torque processor module is embodied on a second electronic board; and said servo control module is embodied on a third electronic board and said system level module is embodied on a fourth electronic board.

5. A modular robot control as set forth in claim 3 wherein:

each of said microprocessor servo means includes first and second microprocessors;

said first microprocessor having relatively high data processing capability and said second microprocessor having relatively high computational capability; and means for coupling said first and second microprocessors in each microprocessor series means so as to enable said first microprocessor to manage the flow of input/output data to and from said second microprocessor.

6. A modular robot control as set forth in claim 1 wherein said generating circuit means in said arm interface module generates said power amplifier control signals for said power amplifiers supplying brushless DC joint motors or for said power amplifiers supplying brush type DC motors according to the type of motors provided on the robot; and said processing and manipulating circuit means in said arm interface module includes means for generating position and velocity feedback signals from incremental motor position sensors or for processing position and velocity feedback signals respectively from absolute motor position sensors and motor tachometers.

7. A modular robot control as set forth in claim 1 wherein said arm interface module is embodied on a first electronic board;

said torque processor module is embodied on a second electronic board; and said position/velocity servo module is embodied on a third electronic board.

8. A modular robot control as set forth in claim 5 wherein:

said generating circuit means in said arm interface module generates said power amplifier control signals for said power amplifiers supplying brushless DC joint motors or for said power amplifiers supplying brush type DC motors according to the type of motors provided on the robot; and said processing and manipulating circuit means in said arm interface module includes means for generating position and velocity feedback signals from incremental motor position sensors or for processing position and velocity feedback signals respectively from absolute motor position sensors and motor tachometers.

9. A modular robot control as set forth in claim 8 wherein said generating circuit means on said arm interface board includes a pulse width generator circuit.

10. A modular robot control as set forth in claim 8 wherein said arm interface module further includes circuit means for processing feedback current signals.

11. A module digital control for a robot having an arm with each of a plurality of joints driven by an electric motor in turn supplied with drive current by a power amplifier, said modular robot control being implemented by a hierarchical set of functionally integrated modules, comprising:

an arm interface module having circuitry for performing robot arm dependent functions including circuit means for generating power amplifier control signals in response to input voltage command signals;

said arm interface module circuitry further including circuit means for processing and manipulating position, velocity and motor current feedback signals;

a torque processor module having torque microprocessor servo means for operating each of respective torque control loops for the respective joint motors;

said torque microprocessor servo means generating said input voltage command signals in response to input torque commands and feedback motor current signals;

a servo control module having position/velocity microprocessor servo means having digital signal processing capability for operating position and velocity control loops for the respective joint motors;

said position/velocity microprocessor servo means generating said input torque commands in response to input position commands and said position and velocity feedback signals;

said servo control module further including system resource means providing a hierarchical general support for the operation of said servo means providing enhancement in performance and functionality, and including data communicating control means for communications interfacing with local input/output devices and other systems and devices;

program storage means for storing program means operative when executed to provide trajectory planning and interpolation and generate said input position commands in accordance with predefined moves set forth in a robot program;

means for coupling said program storage means to said position/velocity microprocessor servo means to enable execution of said program means therein; and means for interconnecting said servo control, torque processor and arm interface modules to provide a complete basic control for said robot joint motors.

* * * * *